(12) United States Patent
Srinivasan et al.

(10) Patent No.: US 8,411,897 B2
(45) Date of Patent: Apr. 2, 2013

(54) ADVANCED WATERMARKING SYSTEM AND METHOD

(75) Inventors: Venugopal Srinivasan, Palm Harbor, FL (US); Atul Puri, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 431 days.

(21) Appl. No.: 12/300,980

(22) PCT Filed: Aug. 18, 2008

(86) PCT No.: PCT/US2008/009888
§ 371 (c)(1),
(2), (4) Date: May 26, 2010

(87) PCT Pub. No.: WO2009/025805
PCT Pub. Date: Feb. 26, 2009

(65) Prior Publication Data
US 2010/0226523 A1    Sep. 9, 2010

Related U.S. Application Data

(60) Provisional application No. 60/956,545, filed on Aug. 17, 2007.

(51) Int. Cl.
*G06K 9/00* (2006.01)
(52) U.S. Cl. .................................................. 382/100
(58) Field of Classification Search .................. 382/100, 382/232–253; 380/200–242; 358/3.28, 426.01–426.16; 348/384.1–440.1; 375/122, 240.01–240.29
See application file for complete search history.

(56) References Cited

U.S. PATENT DOCUMENTS

| | | | |
|---|---|---|---|
| 6,996,521 | B2 | 2/2006 | Iliev et al. |
| 7,705,753 | B2 | 4/2010 | Speirs et al. |
| 2002/0120849 | A1 | 8/2002 | McKinley et al. |
| 2003/0103645 | A1 | 6/2003 | Levy et al. |
| 2004/0059918 | A1 | 3/2004 | Xu et al. |
| 2006/0239503 | A1 | 10/2006 | Petrovic et al. |
| 2007/0064940 | A1 | 3/2007 | Moskowitz et al. |
| 2007/0113094 | A1 | 5/2007 | Moskowitz et al. |

OTHER PUBLICATIONS

International Search Report with Written Opinion, dated Nov. 13, 2008, in international patent applicaiton No. PCT/US08/73532, 8 pgs.

*Primary Examiner* — Atiba O Fitzpatrick
(74) *Attorney, Agent, or Firm* — Æ ON Law; Adam L. K. Philipp

(57) ABSTRACT

A method, computer program product, and computing device for obtaining an uncompressed digital media data file. One or more default watermarks is inserted into the uncompressed digital media data file to form a watermarked uncompressed digital media data file. The watermarked uncompressed digital media data file is compressed to form a first watermarked compressed digital media data file. The first watermarked compressed media data file is stored on a storage device. The first watermarked compressed media data file is retrieved from the storage device. The first watermarked compressed digital media data file is modified to associate the first watermarked compressed digital media data file with a transaction identifier to form a second watermarked compressed digital media data file.

12 Claims, 16 Drawing Sheets

FIG. 8(a): transaction identifier (212) | asset identifier (214) | asset identifier (214) | ........

FIG. 8(b): space (224) | asset identifier (214) | transaction identifier (212) | space (224) | asset identifier (214) | ........

FIG. 8(c): space (224) | asset identifier (214) | distributor identifier (220) | content provider identifier (222) | space (224) | speed change word (218) | transaction identifier (212) | ........

FIG. 8(d): transaction identifier (212) | synchronization word (216) | asset identifier (214) | transaction identifier (212) | speed change word (218) | asset identifier (214) | space (224) | ........

FIG. 8(e): synchronization word (216) | transaction identifier (212) | content provider identifier (222) | distributor identifier (220) | transaction identifier (212) | asset identifier (214) | synchronization word (216) | ........

ADVANCED WATERMARKING SYSTEM AND METHOD

RELATED APPLICATIONS

The subject application is a U.S. National Stage application that claims the priority of International Application No. PCT/US08/09888, filed on 18 Aug. 2008, which claims the benefit of U.S. Provisional Application No.: 60/956,545, filed on 17 Aug. 2007.

TECHNICAL FIELD

This application relates to watermarking of digital media and, more particularly, to digital watermarking performed in multiple stages.

BACKGROUND

The advent of digital media, such as digital speech, audio, graphics, images, and video, has significantly improved many existing applications, as well as introduced many new applications. This is due, in large part, to the relative ease by which digital media may be stored, transmitted, searched, and accessed.

Media data is often analog data that is converted into digital data using e.g., Pulse Coded Modulation (PCM), which may result in the generation of a significant amount of digital data. As an example, high quality PCM digital music is available on Compact Disk (CD). When a music CD is encoded with stereo PCM digital music at a sampling rate of 44.1 kHz with sixteen bits per sample (generating a raw data rate of 1411 kbits/s), the music CD is capable of storing about 650 megabytes of digital music with error correction (about 64 minutes of music) and about 746 megabytes of digital music without error correction (about 74 minutes of music).

Unfortunately, due to the size of the above-described PCM digital music files, when downloading/transferring such digital music files, the download/transfer may take a considerable amount of time. Thus, for efficient communication, storage and/or transmission of digital music files, the digital music files may be compressed using one of a plurality of compression techniques (e.g., MPEG and ITU-T standards committees, as well as proprietary solutions).

Over time the approaches used for compression have grown very sophisticated. Indeed, these approaches may allow high compression for audio that can reach a factor between 5 and 15, while still producing very high psychoacoustic quality that is similar to the uncompressed audio. Moreover, the compression factor attainable for video is even higher, and depending on the resolution, it can vary between factors of 10 and 100. For instance, due to such compression schemes, digitized movies with standard television resolution and quality have been available on Digital Video Discs (DVD's) for approximately 10 years, and they are now also available in High Definition format as well.

However, digital multimedia, if unprotected, also brings with it an increase in the risk of piracy. For one, the process of copying of digital multimedia content does not incur any additional loss of quality due to multigenerational effects (associated with analog audio or video tapes), as e.g., the one millionth copy is identical to the original. This is not only a problem with uncompressed multimedia, but even more so with compressed multimedia. With modest compression factors of, e.g., 5, the quality of music can remain perceptually perfect when state of the art compression schemes are used, while enabling a music album to be downloaded/transferred 5 times faster (e.g., in about 6 minutes instead of 30 minutes).

Furthermore, extraction tools are freely available on the internee for ripping of CDs and protected DVDs, as well as tools for re-compressing multimedia content in various formats. Coupled with the advent of peer-to-peer (P2P) networking, large multimedia files can be easily posted on the internet and illegally shared with millions of users. This results in a significant amount of piracy and, thus, lost revenues for content owners. Further, this type of piracy requires complex monitoring to determine the identity of pirates and downloaders of pirated content. Thus, digital multimedia, if unprotected, can pose a significant challenge to preventing piracy.

To address this challenge, a committee effort was launched in 1998 for developing a Secure Digital Music Initiative (SDMI) standard that comprised a specification for portable devices and an overall architecture for delivery of digital music. Digital watermarks were proposed as a key component of the SDMI system. The embedded watermarks, when extracted by a suitable detector, could be used to control aspects of a digital music system (e.g., permit or deny recording, allow copying a certain number of times). Other notable uses of digital watermarks include their ability to establish authorship or ownership, define usage rights and copyright control, and verify the integrity of the content.

In September of 2000, SDMI invited the public to test the attack resistance of its watermarking technology. While a discussion of the results of these tests is beyond the scope of this application, many vulnerabilities of specific watermarking technologies were demonstrated during the SDMI challenge. This eventually led to the abandonment of SDMI's program.

In general, digital watermarks can be either robust or fragile depending on their design. A robust watermark is intended to survive common attacks by securely carrying embedded information, while a fragile watermark is intended to indicate whether the audio signal has been changed due to certain processing methods, including compression, filtering, as well as some types of attack. In the past, watermarks, such as those developed by SDMI, have predominately been used to carry information about access rights to a multimedia file by the user. However, they can also be used to transport information about a user-initiated multimedia file purchase transaction.

Transactional watermarking may thus be described as the process of digital watermarking of each copy of multimedia content with a unique watermark to allow identification of the specific transaction, which may include information related to the purchase and/or download of the multimedia content itself. This type of watermarking introduces additional technological hurdles as compared to general watermarking, as information about a transaction is only available at the time of the transaction. Therefore, embedding must be performed in realtime (i.e., at the time of the transaction).

Conventionally, transactional watermarking has yielded functional, but less than ideal results. For example, FIG. 1a shows a high-level view of conventional watermarking system 10 for watermarking of digital audio. Digital audio may be provided as input to watermark embedder 12 as well as to perceptual analyzer 14. Concurrently, the message to be embedded in the digital audio file may be provided to watermark generator 16, which converts the message to binary code (i.e., watermark) for embedding. Watermark embedder 12 performs the function of embedding this watermark in the audio signal of the digital audio file, but does so while ensuring that the watermark is below the threshold of audibility. To accomplish this, perceptual analyzer 14 measures the amount of masking energy present and modulates the strength of the watermark to be embedded. Watermark embedder 12 may employ any number of known principles of watermarking, however, a spread spectrum embedder generally provides higher quality results. The resulting watermarked audio signal is then encoded (i.e., compressed) by digital audio encoder 18 (e.g., MP3, AAC, WindowsMediaAudio (WMA), or RealAudio (RA) encoder), resulting in a watermarked compressed digital audio file of corresponding format.

The primary limitation of this system is that it is not practical for realtime distribution on a large scale. For example, if employed as an online music store application, conventional watermarking system 10 would result in a system of very high complexity that would be highly inefficient when serving a large number of music files simultaneously. As discussed above, due to size considerations, online music/media stores generally distribute compressed media files to promote efficient transmission (as well as efficient storage), which may be performed after a media file has been watermarked. However, since transaction information is only known at the time of the transaction, such a system requires realtime watermarking and realtime encoding of thousands, and possibly tens of thousands, of music streams being requested at any given time. This makes such a system excessively complex, expensive, and delay sensitive for an online store application.

An example of a conventional approach intended to remedy the limitations of conventional watermarking system 10 is shown at FIG. 1b. Alternate conventional watermarking system 20 of FIG. 1b operates in compressed (bitstream) domain 22. In this system, digital music/audio files may first be encoded by a digital audio encoder 24 similar to that discussed earlier. The resulting compressed audio streams are then stored in compressed media server 26. When specific music content is requested, the corresponding stream is retrieved from compressed media server 26, and partially decoded in partial digital audio decoder 28 to prepare it for embedding of a watermark. The message provided as input to watermark generator 30 is converted to binary code (representing a watermark) and then provided to quantizer scale factors sequence changes mapper 32.

Quantizer scale factors sequence changes mapper 32 alters aspects of the audio encoding that, for example, can slightly change the quantization scale factors of the audio signal of the digital audio file to mimic a sequence of binary digits in order to form a watermark. The selected quantization scale factors may then need to be re-applied on transform coefficients and the changed scale factors, as well as resulting coefficients, may need to be re-encoded in partial digital audio re-encoder 34. The resulting compressed stream is then output, and carries a hidden watermark that may be extracted by a watermark extractor by correctly interpreting embedded variations in quantization scale factors.

The primary limitation of alternate conventional watermarking system 20 is that it is not highly robust. Due to the fact that it operates entirely in the compressed bitstream domain, the coding parameters (e.g., quantization scale factors) of the resulting watermarked compressed digital audio file are rather easy to modify, rendering the watermark useless. A secondary limitation arises from the practical need for fast processing. While alternate conventional watermarking system 20 is more efficient than conventional watermarking system 10, as it operates in compressed domain, the amount of possible realtime processing is still limited.

Overall, at the present time, no single commercial watermarking solution exists that can efficiently, securely, in large numbers, and in realtime, address the problem of recording transactional watermarks into multimedia content.

SUMMARY OF DISCLOSURE

In a first implementation, a method including obtaining an uncompressed digital media data file. One or more default watermarks is inserted into the uncompressed digital media data file to form a watermarked uncompressed digital media data file. The watermarked uncompressed digital media data file is compressed to form a first watermarked compressed digital media data file. The first watermarked compressed media data file is stored on a storage device. The first watermarked compressed media data file is retrieved from the storage device. The first watermarked compressed digital media data file is modified to associate the first watermarked compressed digital media data file with a transaction identifier to form a second watermarked compressed digital media data file.

One or more of the following features may be included. Modifying the first watermarked compressed digital media data file may include modifying the first watermarked compressed digital media data file to associate the first watermarked compressed digital media data file with an asset identifier. Modifying the first watermarked compressed digital media data file may include modifying the first watermarked compressed digital media data file in realtime/near realtime.

The second watermarked compressed digital media data file may be stored on the storage device. The uncompressed digital media data file may be selected from the group consisting of: an audio file and a digital audio portion of a digital audio-visual file. The one or more default watermarks may include asset-specific information. The uncompressed digital media data file may be compressed to form an unwatermarked compressed digital media data file.

Modifying the first watermarked compressed digital media data file may include combining at least a portion of the unwatermarked compressed digital media data file with at least a portion of the first watermarked compressed digital media data file to form the second watermarked compressed digital media data file.

Modifying the first watermarked compressed digital media data file may include generating the transaction identifier, the transaction identifier indicative, at least in part, of an association of the first watermarked compressed digital media data file with a specific transaction. The transaction identifier may be converted into a binary codeword. At least a portion of an unwatermarked compressed digital media data file may be combined with at least a portion of the first watermarked compressed digital media data file. The binary codeword may define at least a portion of the unwatermarked compressed digital media data file and at least a portion of the first watermarked compressed digital media data file to be combined.

Modifying the first watermarked compressed digital media data file may include generating an asset identifier, the asset identifier indicative, at least in part, of an association of asset-specific information with the first watermarked compressed digital media data file. The asset identifier may be converted into a binary codeword. At least a portion of an unwatermarked compressed digital media data file may be combined with at least a portion of the first watermarked compressed digital media data file. The binary codeword may define at least a portion of the unwatermarked compressed digital media data file and at least a portion of the first watermarked compressed digital media data file to be combined.

In another implementation, a computer program product resides on a computer readable medium having a plurality of instructions stored on it. When executed by a processor, the instructions cause the processor to perform operations including obtaining an uncompressed digital media data file. One or more default watermarks is inserted into the uncompressed digital media data file to form a watermarked uncompressed digital media data file. The watermarked uncompressed digital media data file is compressed to form a first watermarked compressed digital media data file. The first watermarked compressed media data file is stored on a storage device. The first watermarked compressed media data file is retrieved from the storage device. The first watermarked compressed digital media data file is modified to associate the first watermarked compressed digital media data file with a transaction identifier to form a second watermarked compressed digital media data file.

One or more of the following features may be included. Modifying the first watermarked compressed digital media data file may include modifying the first watermarked compressed digital media data file to associate the first watermarked compressed digital media data file with an asset identifier. Modifying the first watermarked compressed digital media data file may include modifying the first watermarked compressed digital media data file in realtime/near realtime.

The second watermarked compressed digital media data file may be stored on the storage device. The uncompressed digital media data file may be selected from the group consisting of: an audio file and a digital audio portion of a digital audio-visual file. The one or more default watermarks may include asset-specific information. The uncompressed digital media data file may be compressed to form an unwatermarked compressed digital media data file.

Modifying the first watermarked compressed digital media data file may include combining at least a portion of the unwatermarked compressed digital media data file with at least a portion of the first watermarked compressed digital media data file to form the second watermarked compressed digital media data file.

Modifying the first watermarked compressed digital media data file may include generating the transaction identifier, the transaction identifier indicative, at least in part, of an association of the first watermarked compressed digital media data file with a specific transaction. The transaction identifier may be converted into a binary codeword. At least a portion of an unwatermarked compressed digital media data file may be combined with at least a portion of the first watermarked compressed digital media data file. The binary codeword may define at least a portion of the unwatermarked compressed digital media data file and at least a portion of the first watermarked compressed digital media data file to be combined.

Modifying the first watermarked compressed digital media data file may include generating an asset identifier, the asset identifier indicative, at least in part, of an association of asset-specific information with the first watermarked compressed digital media data file. The asset identifier may be converted into a binary codeword. At least a portion of an unwatermarked compressed digital media data file may be combined with at least a portion of the first watermarked compressed digital media data file. The binary codeword may define at least a portion of the unwatermarked compressed digital media data file and at least a portion of the first watermarked compressed digital media data file to be combined.

In another implementation, a computing device is configured to perform operations including obtaining an uncompressed digital media data file. One or more default watermarks is inserted into the uncompressed digital media data file to form a watermarked uncompressed digital media data file. The watermarked uncompressed digital media data file is compressed to form a first watermarked compressed digital media data file. The first watermarked compressed media data file is stored on a storage device. The first watermarked compressed media data file is retrieved from the storage device. The first watermarked compressed digital media data file is modified to associate the first watermarked compressed digital media data file with a transaction identifier to form a second watermarked compressed digital media data file.

One or more of the following features may be included. Modifying the first watermarked compressed digital media data file may include modifying the first watermarked compressed digital media data file to associate the first watermarked compressed digital media data file with an asset identifier. Modifying the first watermarked compressed digital media data file may include modifying the first watermarked compressed digital media data file in realtime/near realtime.

The second watermarked compressed digital media data file may be stored on the storage device. The uncompressed digital media data file may be selected from the group consisting of: an audio file and a digital audio portion of a digital audio-visual file. The one or more default watermarks may include asset-specific information. The uncompressed digital media data file may be compressed to form an unwatermarked compressed digital media data file.

Modifying the first watermarked compressed digital media data file may include combining at least a portion of the unwatermarked compressed digital media data file with at least a portion of the first watermarked compressed digital media data file to form the second watermarked compressed digital media data file.

Modifying the first watermarked compressed digital media data file may include generating the transaction identifier, the transaction identifier indicative, at least in part, of an association of the first watermarked compressed digital media data file with a specific transaction. The transaction identifier may be converted into a binary codeword. At least a portion of an unwatermarked compressed digital media data file may be combined with at least a portion of the first watermarked compressed digital media data file. The binary codeword may define at least a portion of the unwatermarked compressed digital media data file and at least a portion of the first watermarked compressed digital media data file to be combined.

Modifying the first watermarked compressed digital media data file may include generating an asset identifier, the asset identifier indicative, at least in part, of an association of asset-specific information with the first watermarked compressed digital media data file. The asset identifier may be converted into a binary codeword. At least a portion of an unwatermarked compressed digital media data file may be combined with at least a portion of the first watermarked compressed digital media data file. The binary codeword may define at least a portion of the unwatermarked compressed digital media data file and at least a portion of the first watermarked compressed digital media data file to be combined.

In another implementation, a method includes modifying a compressed digital media data file to include a plurality of watermarks, thus generating a multi-watermarked digital media data file.

One or more of the following features may be included. The method of claim 1 wherein the plurality of watermarks includes one or more of: a transaction identifier, an asset identifier, a synchronization word, a speed change word, a space, a content provider identifier, and a distributor identifier. The plurality of watermarks includes at least two identical watermarks. The plurality of watermarks includes at least two unique watermarks. A segment map may be utilized to modify the compressed digital media data file.

Utilizing the segment map may include receiving digital media data file parameters and watermark parameters defining attributes of the compressed digital media data file. Utilizing the segment map further may include receiving a watermark scheme of the compressed digital media data file. Utilizing the segment map may include analyzing the digital media data file parameters, the watermark parameters, and the watermark scheme to define the segment map based upon, at least in part, the digital media data file parameters, the watermark parameters, and the watermark scheme.

The watermark scheme may include a variable pattern of a transaction identifier, an asset identifier, a synchronization word, a speed change word, a space, a content provider identifier, and a distributor identifier. The uncompressed digital media data file may be selected from the group consisting of: an audio file and a digital audio portion of a digital audiovisual file.

In another implementation, a computer program product resides on a computer readable medium having a plurality of instructions stored on it. When executed by a processor, the instructions cause the processor to perform operations including modifying a compressed digital media data file to include a plurality of watermarks, thus generating a multi-watermarked digital media data file.

One or more of the following features may be included. The method of claim 1 wherein the plurality of watermarks includes one or more of: a transaction identifier, an asset identifier, a synchronization word, a speed change word, a space, a content provider identifier, and a distributor identifier. The plurality of watermarks includes at least two identical watermarks. The plurality of watermarks includes at least two unique watermarks. A segment map may be utilized to modify the compressed digital media data file.

Utilizing the segment map may include receiving digital media data file parameters and watermark parameters defining attributes of the compressed digital media data file. Utilizing the segment map further may include receiving a watermark scheme of the compressed digital media data file. Utilizing the segment map may include analyzing the digital media data file parameters, the watermark parameters, and the watermark scheme to define the segment map based upon, at least in part, the digital media data file parameters, the watermark parameters, and the watermark scheme.

The watermark scheme may include a variable pattern of a transaction identifier, an asset identifier, a synchronization word, a speed change word, a space, a content provider identifier, and a distributor identifier. The uncompressed digital media data file may be selected from the group consisting of: an audio file and a digital audio portion of a digital audiovisual file.

The details of one or more implementations are set forth in the accompanying drawings and the description below. Other features and advantages will become apparent from the description, the drawings, and the claims.

BRIEF DESCRIPTION OF THE DRAWINGS

FIGS. 8(a)-8(e) are diagrammatic views of exemplary watermark placements as executed by the digital media watermarking system of FIG. 2;

Like reference symbols in the various drawings indicate like elements.

DETAILED DESCRIPTION OF EXEMPLARY EMBODIMENTS

Figure 1A:
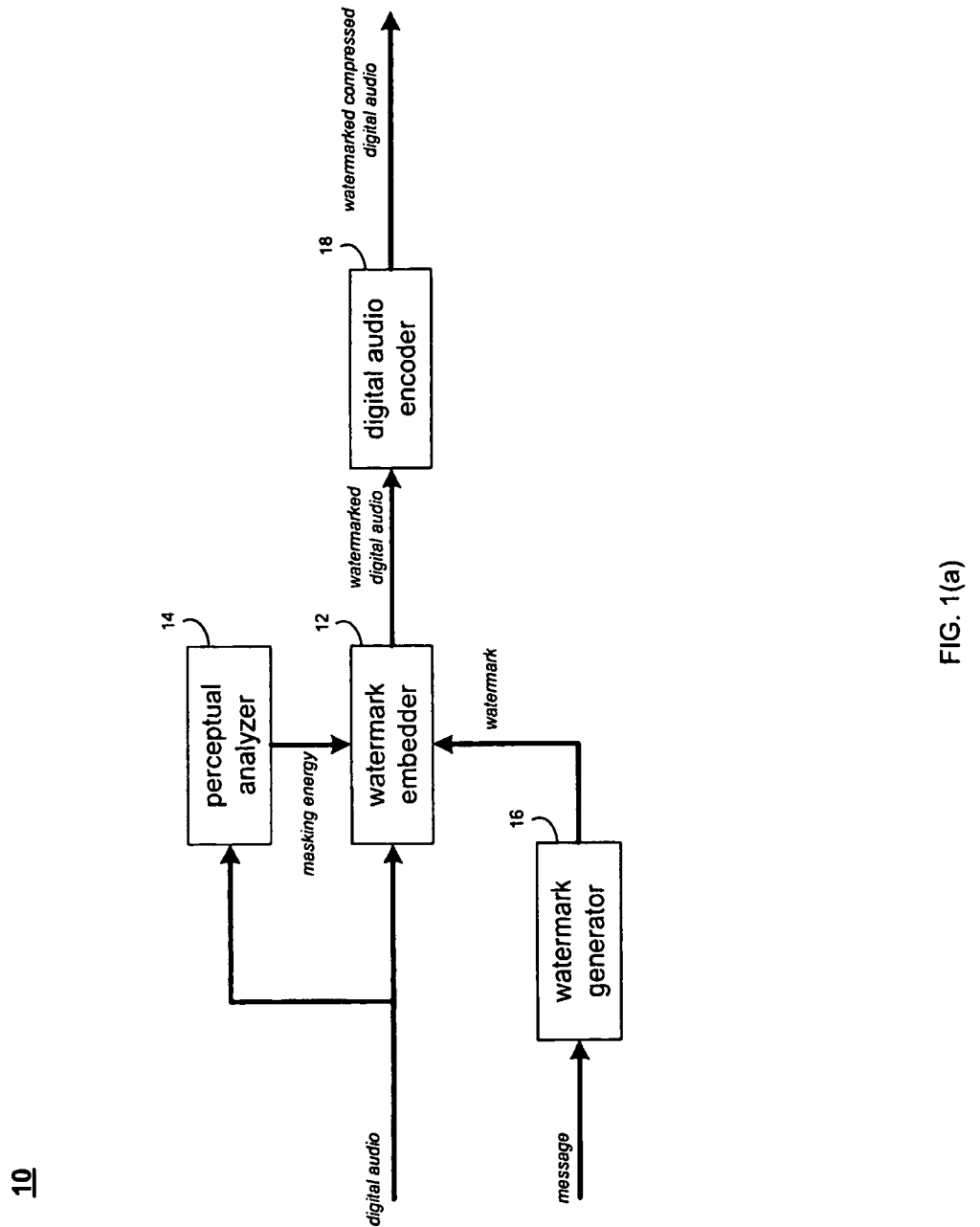
FIG. 1(a) is a diagrammatic view of a prior art watermarking system.
Figure 1B:
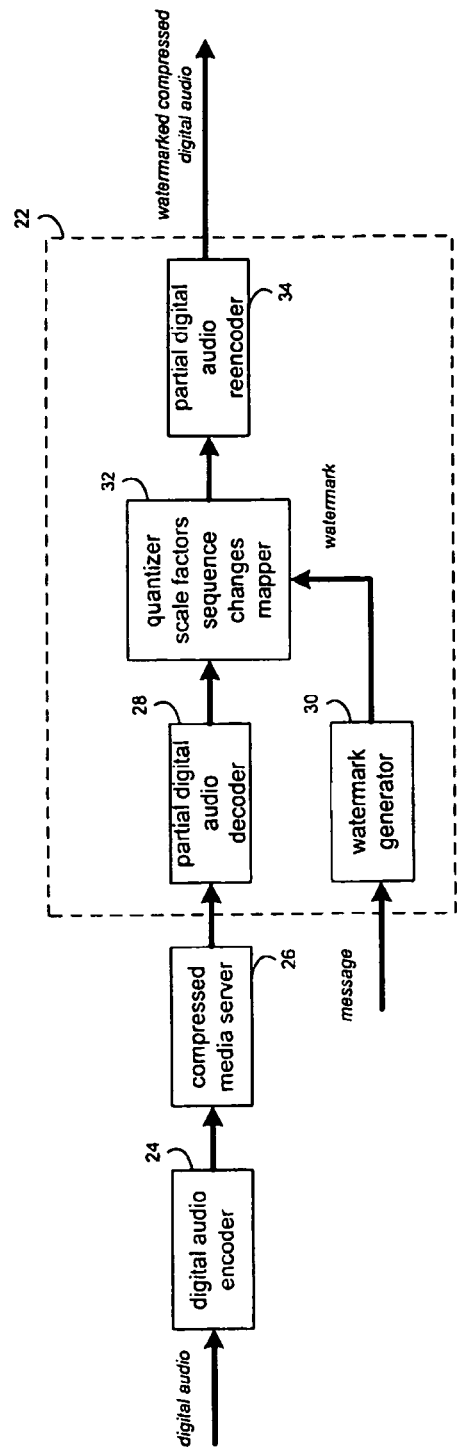
FIG. 1(b) is diagrammatic view of another prior art watermarking system.
Figure 2:
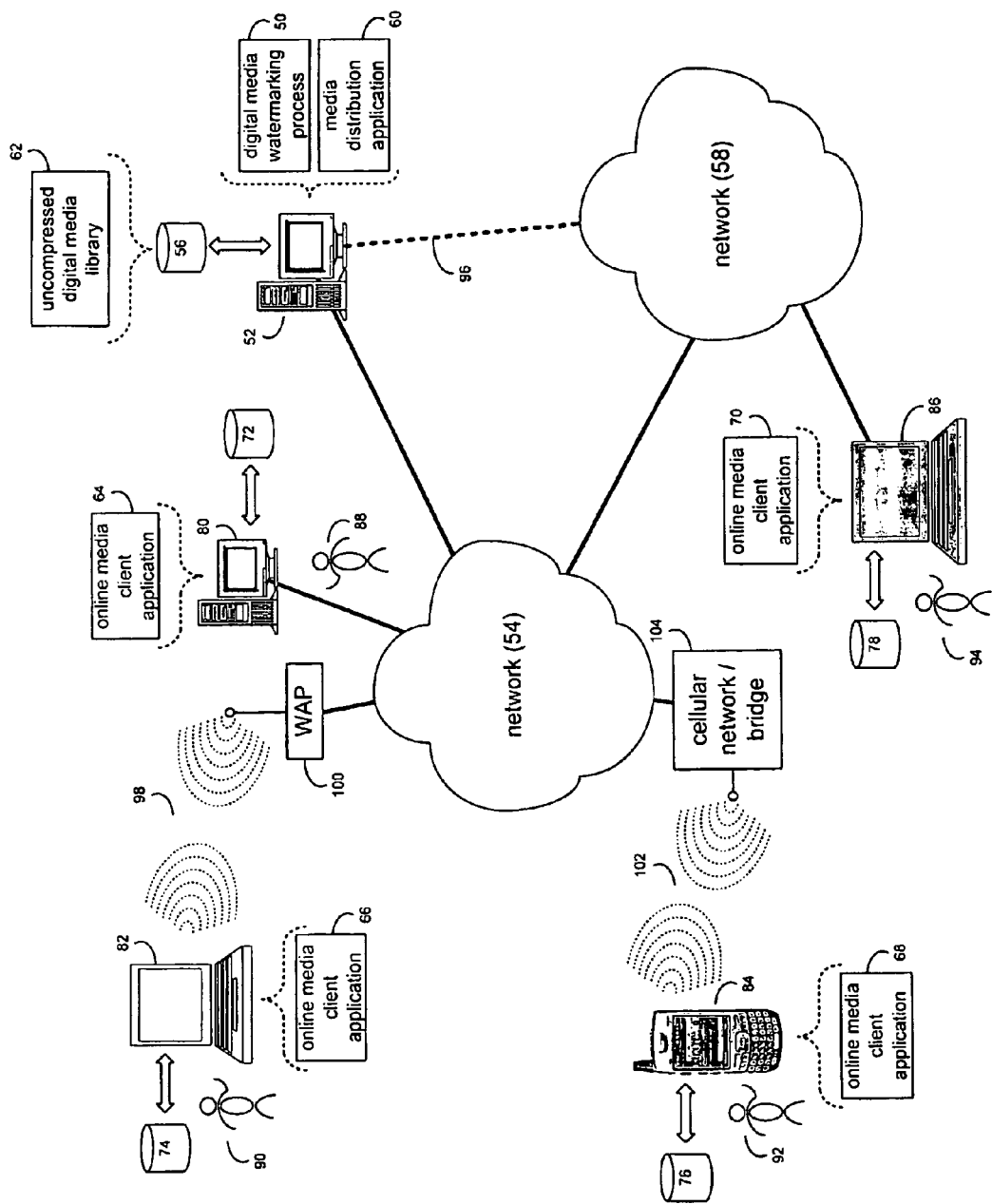
FIG. 2 is a diagrammatic view of a digital media watermarking system, a media distribution application, and client applications coupled to a distributed computing network.

System Overview:

Referring to FIG. 2, there is shown digital media watermarking process 50 that may reside on and may be executed by server computer 52, which may be connected to network 54 (e.g., the Internet or a local area network). Examples of server computer 52 may include, but are not limited to: a personal computer, a server computer, a series of server computers, a mini computer, and a mainframe computer. Server computer 52 may be a web server (or a series of servers) running a network operating system, examples of which may include but are not limited to: Microsoft Windows XP Server™; Novell Netware™; or Redhat Linux™, for example. Alternatively, digital media watermarking process 50 may reside on and be executed, in whole or in part, by a client electronic device, such as a personal computer, notebook computer, personal digital assistant, or the like.

The instruction sets and subroutines of digital media watermarking process 50, which may be stored on storage device 56 coupled to server computer 52, may be executed by one or more processors (not shown) and one or more memory architectures (not shown) incorporated into server computer 52. Storage device 56 may include but is not limited to: a hard disk drive; a tape drive; an optical drive; a RAID array; a random access memory (RAM); and a read-only memory (ROM).

Server computer 52 may execute a web server application, examples of which may include but are not limited to: Microsoft IIS™, Novell Webserver™, or Apache Webserver™, that allows for HTTP (i.e., HyperText Transfer Protocol) access to server computer 52 via network 54. Network 54 may be connected to one or more secondary networks (e.g., network 58), examples of which may include but are not limited to: a local area network; a wide area network; or an intranet, for example.

Server computer 52 may execute a media distribution application, examples of which may include, but are not limited to RealNetworks Rhapsody Server™, Apple iTunes Server™, and Microsoft Windows Media Server™. Media distribution application 60 may distribute requested media content from digital media watermarking process 50 (which acquires uncompressed digital media files that may be stored, at least in part, in uncompressed media library 62, residing on storage device 56 of server computer 52) to online media client applications, e.g., online media client applications 64, 66, 68, 70. Examples of online media client applications 64, 66, 68, 70 may include but are not limited to RealNetworks Rhapsody™, Apple iTunes™, and Microsoft Windows Media Player™, for example. The requested media content provided to media distribution application 60 by digital media watermarking process 50 is stored in uncompressed digital media library 62. Digital media watermarking process 50 may be a stand alone application that interfaces with media distribution application 60 or an applet/application that is executed within media distribution application 60.

The instruction sets and subroutines of media distribution application 60, which may be stored on storage device 56 coupled to server computer 52 may be executed by one or more processors (not shown) and one or more memory architectures (not shown) incorporated into server computer 52.

As mentioned above, in addition/as an alternative to being a server-based application residing on server computer 52, digital media watermarking process 50 may be a client-side application (not shown) residing on one or more client electronic device 80, 82, 84, 86 (e.g., stored on storage device 72, 74, 76, 78, respectively), and executed by a processor (not shown) and memory architecture (not shown) incorporated into the one or more client electronic devices. The client-side digital media watermarking system (not shown) may be a stand alone application that interfaces with an online media client application (e.g., online media client applications 64, 66, 68, 70), or may be an applet/application that is executed within an online media client application. As such, digital media watermarking system 50 may be a client-side application, a server-based application, or a hybrid client-side/server-based application, which may be executed, in whole or in part, by server computer 52, and/or one or more client electronic device (e.g., client electronic devices 80, 82, 84, 86).

The instruction sets and subroutines of online media client applications 64, 66, 68, 70, which may be stored on storage devices 72, 74, 76, 78 (respectively) coupled to client electronic devices 80, 82, 84, 86 (respectively), may be executed by one or more processors (not shown) and one or more memory architectures (not shown) incorporated into client electronic devices 80, 82, 84, 86 (respectively). Storage devices 72, 74, 76, 78 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 80, 82, 84, 86 may include, but are not limited to, personal computer 80, laptop computer 82, personal digital assistant 84, notebook computer 86, a data-enabled, cellular telephone (not shown), and a dedicated network device (not shown), for example. Using online media client applications 64, 66, 68, 70, users 88, 90, 92, 94 may access media distribution application 60 and may request the delivery of media content.

Users 88, 90, 92, 94 may access media distribution application 60 directly through the device on which the online media client application (e.g., online media client applications 64, 66, 68, 70) is executed, namely client electronic devices 80, 82, 84, 86, for example. Users 88, 90, 92, 94 may access media distribution application 60 directly through network 54 or through secondary network 58. Further, server computer 52 (i.e., the computer that executes media distribution application 60) may be connected to network 54 through secondary network 58, as illustrated with phantom link line 96.

The various client electronic devices may be directly or indirectly coupled to network 54 (or network 58). For example, personal computer 80 is shown directly coupled to network 54 via a hardwired network connection. Further, notebook computer 86 is shown directly coupled to network 58 via a hardwired network connection. Laptop computer 82 is shown wirelessly coupled to network 54 via wireless communication channel 98 established between laptop computer 82 and wireless access point (i.e., WAP) 100, which is shown directly coupled to network 54. WAP 100 may be, for example, an IEEE 802.11a, 802.11b, 802.11g, 802.11n, Wi-Fi, and/or Bluetooth device that is capable of establishing wireless communication channel 98 between laptop computer 82 and WAP 100. Personal digital assistant 84 is shown wirelessly coupled to network 54 via wireless communication channel 102 established between personal digital assistant 84 and cellular network/bridge 104, which is shown directly coupled to network 54.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 80, 82, 84, 86 may each execute an operating system, examples of which may include but are not limited to Microsoft Windows™, Microsoft Windows CE™, Redhat Linux™, or a custom operating system.

Figure 3:
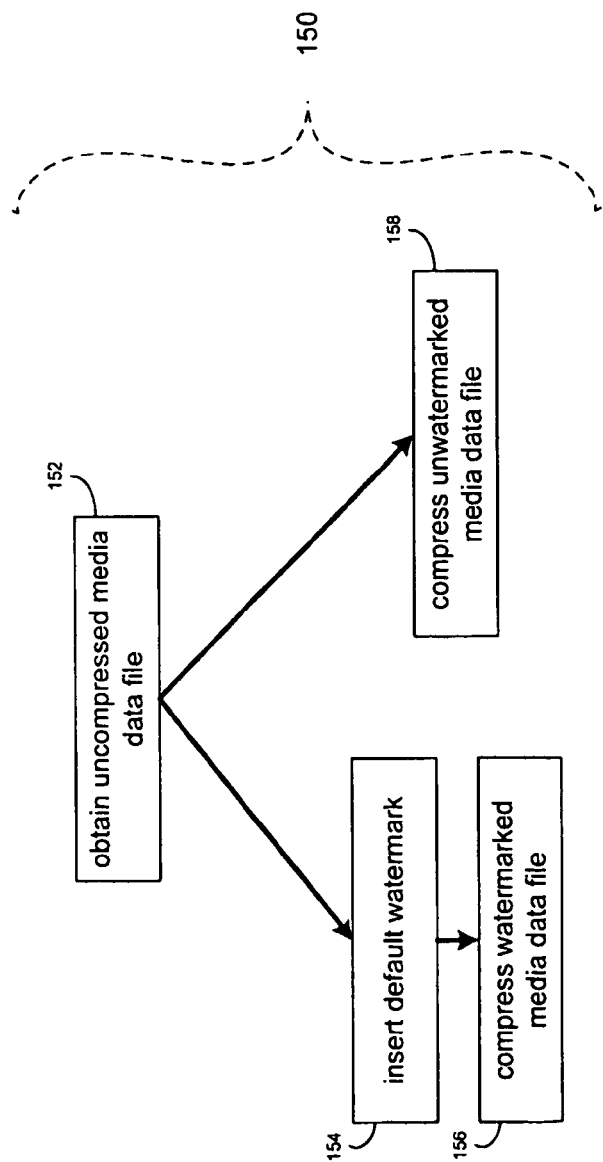
FIG. 3 is a flowchart of a process executed by the digital media watermarking system of FIG. 2.
Figure 4:
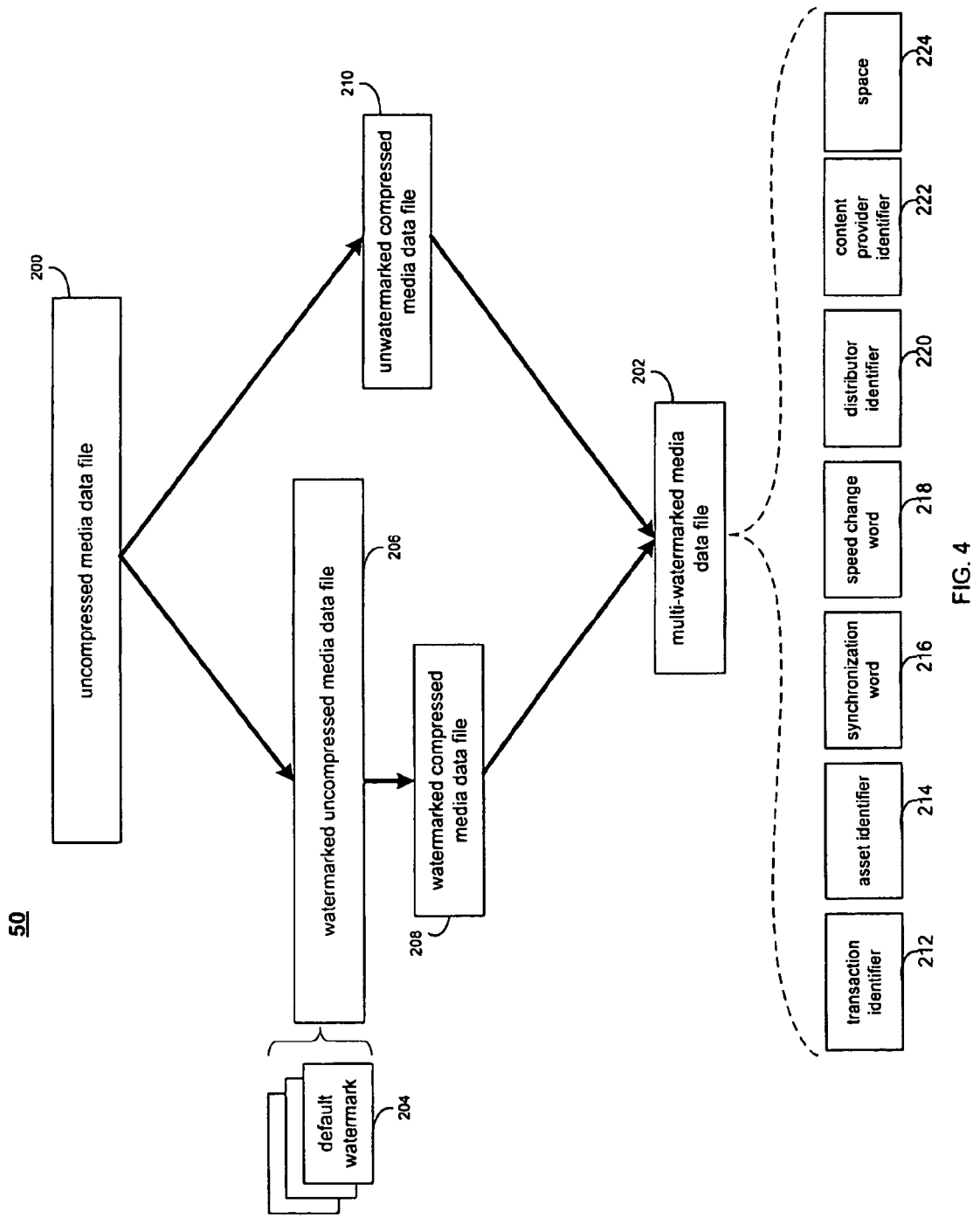
FIG. 4 is a diagrammatic view of a portion of the digital media watermarking system of FIG. 2.

Referring also to FIGS. 3 & 4, there is shown a diagrammatic view of digital, media watermarking process 50. While, as discussed above, digital media watermarking process 50 may be a stand alone application that interfaces with media distribution application 60 or an applet/application that is executed within media distribution application 60, for illustrative purposes, digital media watermarking process 50 will be described in this disclosure as being executed within media distribution application 60. Further and also for illustrative purposes, media distribution application 60 will be described as an online music store. However, this is not intended to be a limitation of this disclosure and, accordingly, the following discussion may be equally applied to a variety of media delivery systems or in an independent digital media watermarking environment devoid of delivery considerations.

Within the illustrative context of an online music store, upon request from media distribution application 60 (e.g., in response to a transaction initiated by one or more of users 88, 90, 92, 94), digital media watermarking process 50 may obtain 150 uncompressed media data file 200 from uncompressed digital media library 62. Digital media watermarking process 50 may also insert 152 one or more default watermarks 202 into uncompressed media data file 200 to form watermarked uncompressed media data file 204. Furthermore, digital media watermarking process 50 may compress 154 watermarked uncompressed media data file 204 to form watermarked compressed media data file 206. Additionally, digital media watermarking process 50 may also compress 156 uncompressed media data file 200 to form unwatermarked compressed media data file 208.

Watermarked compressed media data file 206 may then be modified 158 by digital media watermarking process 50 to associate watermarked compressed media data file 206 with information selected from at least one of a transaction identifier 210 and an asset identifier 212 to form non-generic compressed media data file 214. As will be described more fully below, transaction identifier 210 may include information about a realtime transaction, and asset identifier 212 may include information about the digital media data file (e.g., uncompressed media data file 200 or non-generic compressed media data file 214). Digital media watermarking process 50 may then provide non-generic compressed media data file 214 to media distribution application 60 for e.g., delivery to users 88, 90, 92, 94.

As will be discussed in greater detail below, digital media watermarking process 50 may perform several functions prior to a request from media distribution application 60 (i.e., prior to a transaction initiated by, e.g., one or more of users 88, 90, 92, 94). These functions may include, but are not limited to: obtaining 150 uncompressed media data file 200; inserting 152 one or more default watermarks 202 into uncompressed media data file 200 to form watermarked uncompressed media data file 204; compressing 154 watermarked uncompressed media data file 204 to form watermarked compressed media data file 206; and compressing 156 uncompressed media data file 200 to form unwatermarked compressed media data file 208. Such a case of pre-transaction processing by digital media watermarking process 50 may be referred to as non-realtime processing 250. Conversely, and as will be described in detail below, post-transaction processing by digital media watermarking process 50 may be referred to as realtime processing.

Figure 5A:
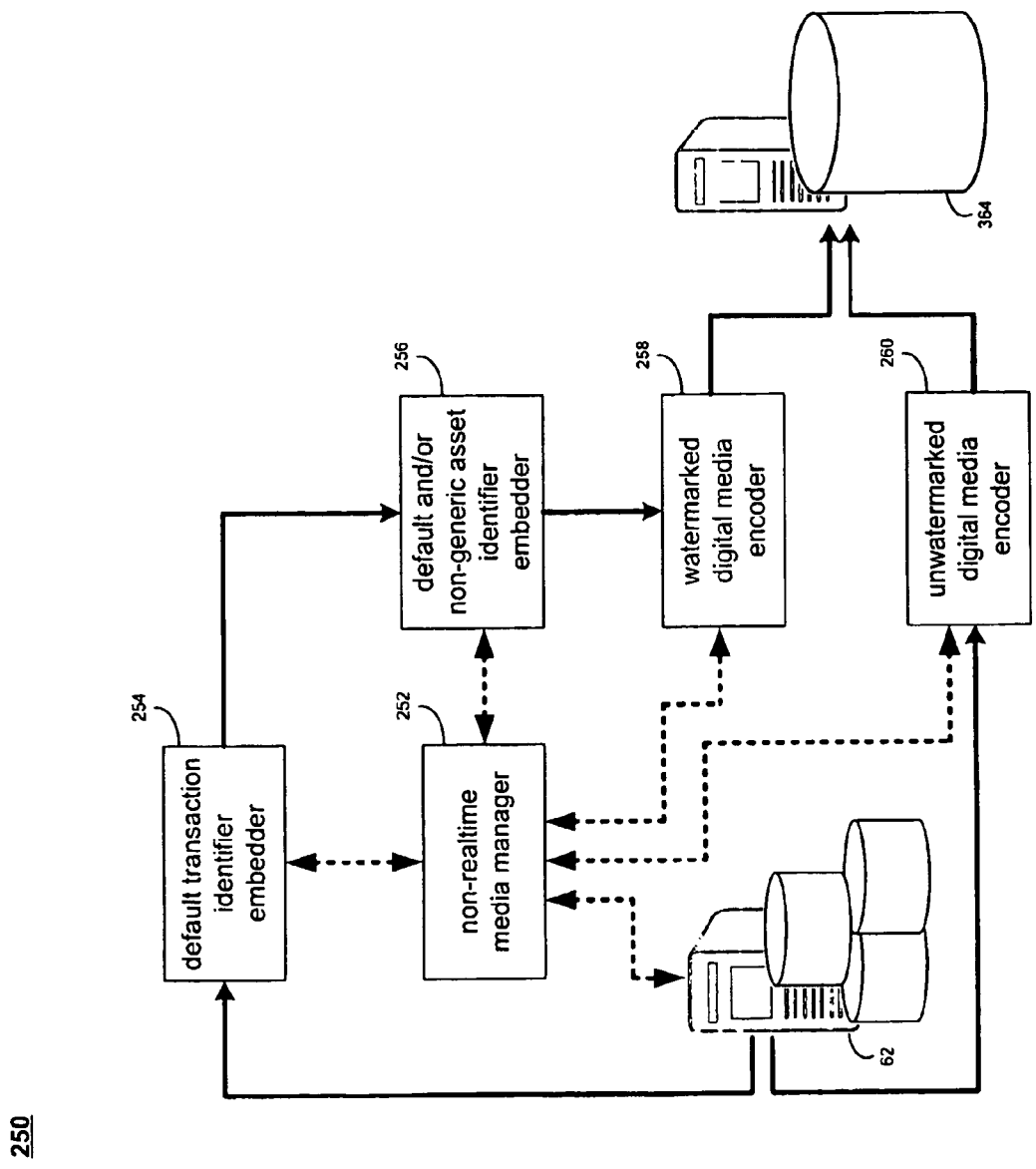
FIG. 5(a) is a diagrammatic view of a portion of the digital media watermarking system of FIG. 2.
Figure 5B:
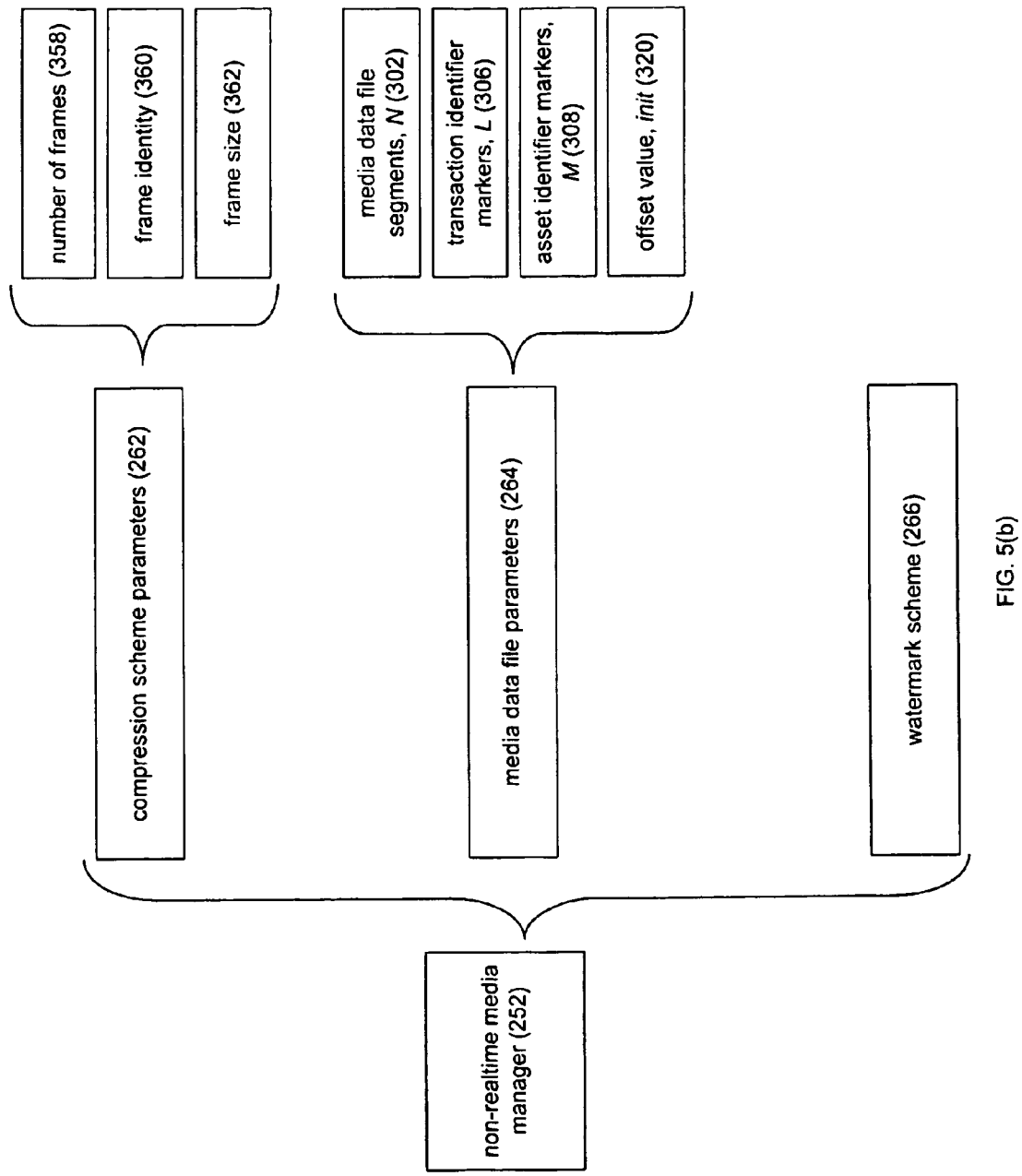
FIG. 5(b) is a diagrammatic view of exemplary encoding options controlled by a process executed by the digital media watermarking system of FIG. 2.

Non-Realtime Processing:

Referring also to FIG. 5(*a*), digital media watermarking process 50 may perform non-realtime processing 250 prior to initiation of a transaction by e.g., one or more of users 88, 90, 92, 94. For example, in preparation for distribution by media distribution application 60, digital media watermarking process 50 may perform non-realtime processing 250 on a subset (or all) of uncompressed media data files 200 stored in uncompressed digital media library 62. However, this is not intended to be a limitation of this disclosure, as digital media watermarking process 50 may perform non-realtime processing 250 on a subset (or all) of uncompressed media data file 200 stored in uncompressed digital media library 62 in response to initiation of a transaction (i.e., in realtime) by e.g., one or more of users 88, 90, 92, 94.

To accomplish the above-described non-realtime processing 250 of digital media watermarking process 50, one or more of the following may be utilized: non-realtime media manager 252, default transaction identifier embedder 254, default and/or non-generic asset identifier embedder 256, watermarked digital media encoder 258, and unwatermarked digital media encoder 260. Non-realtime media manager 252 may manage the transformation of uncompressed media data file 200 into watermarked compressed media data file 206 as well as the transformation of uncompressed media data file 200 into unwatermarked compressed media data file 208. Default transaction identifier embedder 254 may insert 152 one or more transaction identifiers 210 into uncompressed media data file 200. Default and/or non-generic asset identifier embedder 256 may insert 152 one or more asset identifiers 212 into uncompressed media data file 200.

Watermarked digital media encoder 258 may compress 154 watermarked uncompressed media data file 204 to form watermarked compressed media data file 206. Unwatermarked digital media encoder 260 may compress 156 uncompressed media data file 200 from its initial state to form unwatermarked compressed media data file 208.

Referring to the transformation of uncompressed media data file 200 into watermarked compressed media data file 206, non-realtime media manager 252 of digital media watermarking process 50 may obtain 150 uncompressed media data file 200 from uncompressed digital media library 62. For example, non-realtime media manager 252 may manage the obtaining 150 of uncompressed media data file 200 from uncompressed digital media library 62 and its delivery to default transaction identifier embedder 254 for insertion 152 of transaction identifier 210.

Referring also to FIG. 5(*b*), in addition to managing data propagation throughout non-realtime processing 250, non-realtime media manager 252 may also manage encoding options. Examples of encoding options may include, but are not limited to: selection of compression scheme parameters 270 (examples of which are provided below); defining of a plurality of media data file parameters 272 based upon, at least in part, the attributes of uncompressed media data file 200, watermarked compressed media data file 206, and unwatermarked compressed media data file 208; and selection of watermark scheme 274. The selection of watermark scheme 274 may include, but is not limited to, determining the type, frequency, and location of watermark insertion 152, as well as the parameters that define any particular watermark (e.g., watermark size, default watermark values, etc.).

Examples of the format of uncompressed media data file 200 obtained 150 from uncompressed media data library 62 may include, but are not limited to: purchased downloads received from media distribution application 60 (i.e., media content licensed to e.g., user 88 for use in perpetuity); and subscription downloads received from media distribution application 60 (i.e., media content licensed to e.g., user 88 for use while a valid subscription exists with media distribution application 60), for example.

Examples of the types of non-generic compressed media data file 214 (and/or uncompressed media data file 200) distributed by media distribution application 60 may include: audio media data files (examples of which may include but are not limited to music files, audio news broadcasts, audio sports broadcasts, and audio recordings of books, for example); audio/video media data files (examples of which may include but are not limited to a/v news broadcasts, a/v sports broadcasts, feature-length movies and movie clips, music videos, and episodes of television shows, for example); and multimedia content media data files (examples of which may include but are not limited to interactive presentations and slideshows, for example).

While uncompressed media data file 200 is described herein as an audio (e.g., music) file, this is for exemplary purposes only. Uncompressed media data file 200 may also include a digital audio portion of a digital audio-visual file (not shown). For example, multi-media containers (i.e., files containing embedded audio and video streams) are also contemplated in the scope of this disclosure. Examples of such include, but are not limited to: RealMedia™ 3gp, ASF, AVE, MPEG-2, MP4, and MOV.

Figure 6A:
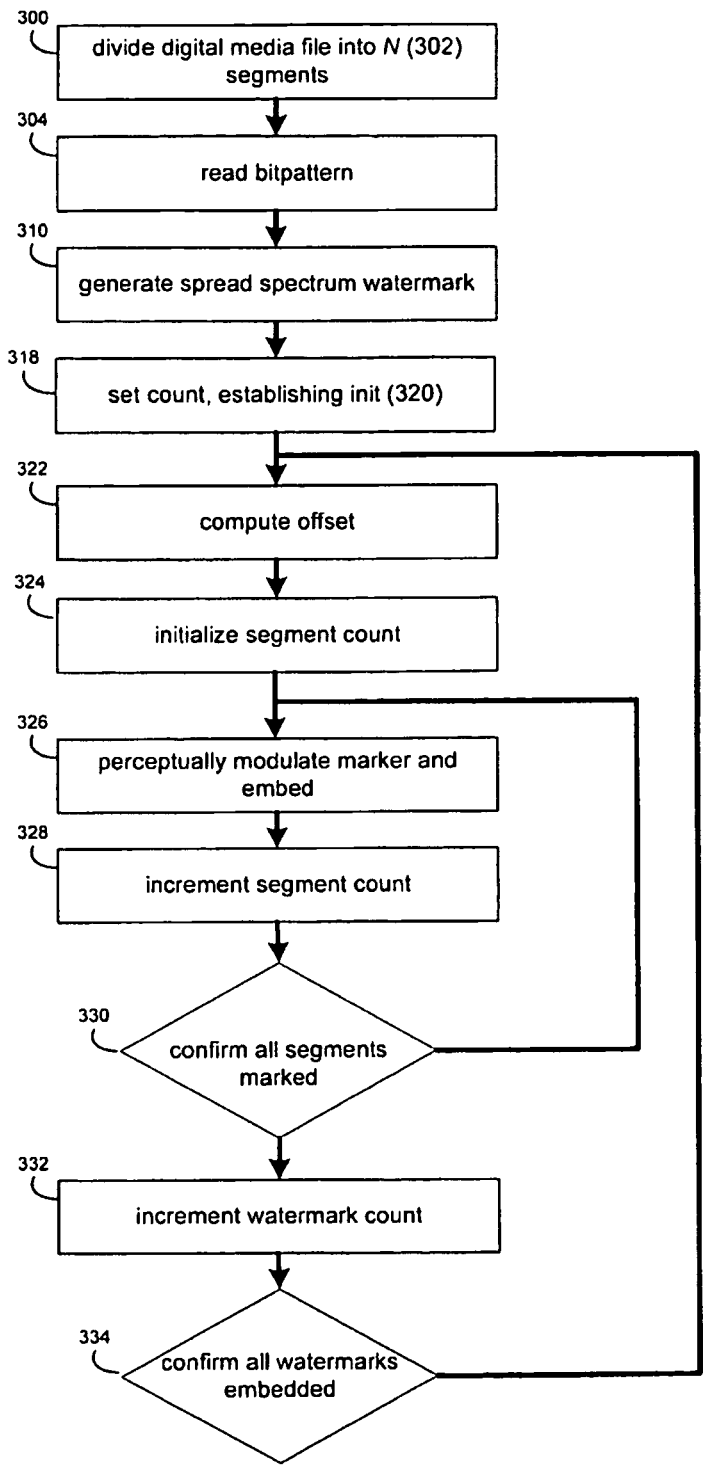
FIG. 6(a) is a flowchart of a process executed by the digital media watermarking system of FIG. 2.
Figure 6B:
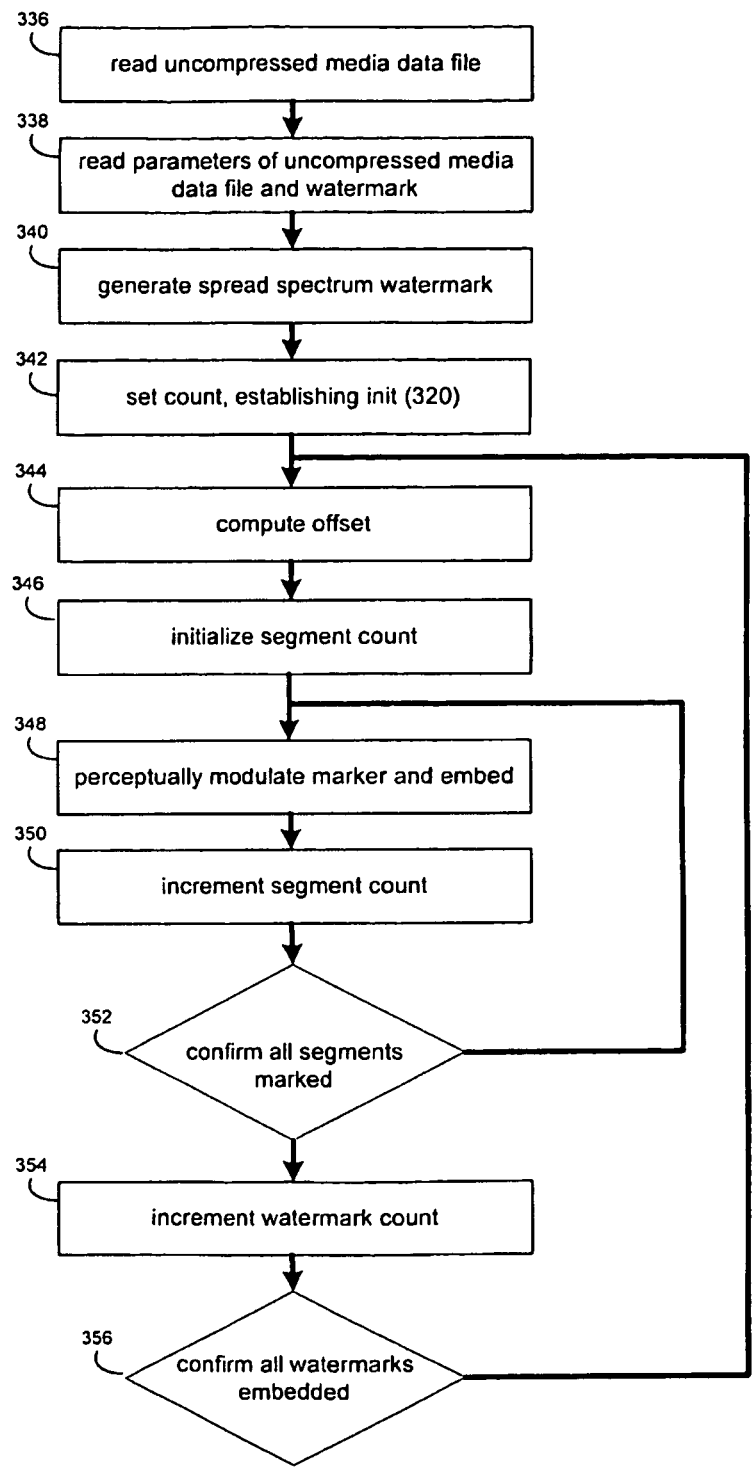
FIG. 6(b) is a flowchart of a process executed by the digital media watermarking system of FIG. 2.

Referring also to FIG. 6(*a*), the process of inserting 152 transaction identifier 210 into uncompressed media data file 200 (i.e., at default transaction identifier embedder 254) may be more fully described. By way of example only, specific values are provided to explain the insertion process, however, as is understood by one of skill in the art, many other suitable values may be selected.

In preparation for the insertion 152 of transaction identifier 210, uncompressed media data file 200 may be divided 300 into a plurality of segments (i.e., N segments). Each segment may consist of e.g., fifty frames, with each frame consisting of e.g., 1,024 samples. An exemplary digital audio file may be encoded in Pulse-Code Modulation (PCM) format. As is known in the art, a PCM encoded digital audio file may be sampled at 44.1 kHz with sixteen bits/sample. Thus, a segment may consist of 51,200 samples, or 819,200 bits. As the number of segments per digital audio file depends on the length of the digital audio file, a length of two minutes (i.e., one-hundred-twenty seconds) will be used for illustrative purposes. Therefore, where: audio_length is the number of seconds in a given digital audio file; sample_rate is the number of samples recorded per second; and segment_size is computed as described above (e.g., fifty frames @ 1,024 samples per frame), dividing 300 uncompressed media data file 200 into N segments may be performed as follows:

$$N=(audio\_length*sample\_rate)/segment\_size$$

$$N=(120 \text{ seconds}*44,100 \text{ samples per second})/(1,024 \text{ samples per frame}*50 \text{ frames per segment})$$

Applying this formula to the above-described example of a two-minute digital audio file, the digital audio file may consist of 103.359 segments (i.e., one-hundred-three complete segments and one partial segment).

Default transaction identifier embedder 254 may read 302 the bit pattern of transaction identifier 210 to have a length of L markers, where a marker may consist of 4,096 chips. As is known in the art, a chip may represent a binary "1" or "0". As a transaction has not yet occurred, a default value for the length of transaction identifier 210 may be provided. For example, transaction identifier 210 may consist of fifty markers, totaling 204,800 chips, wherein the chips may all be pre-set to binary "1" or "0". As will be discussed below in greater detail, asset-specific information (upon which asset identifier 212 is defined) may be known prior to the occurrence of a transaction, in which case the specific length of asset identifier 212 may similarly be known. Thus, an actual value for M, the length of asset identifier 212, may be generated (and read 302 by default transaction identifier embedder 254) in lieu of a default value.

Figure 7:
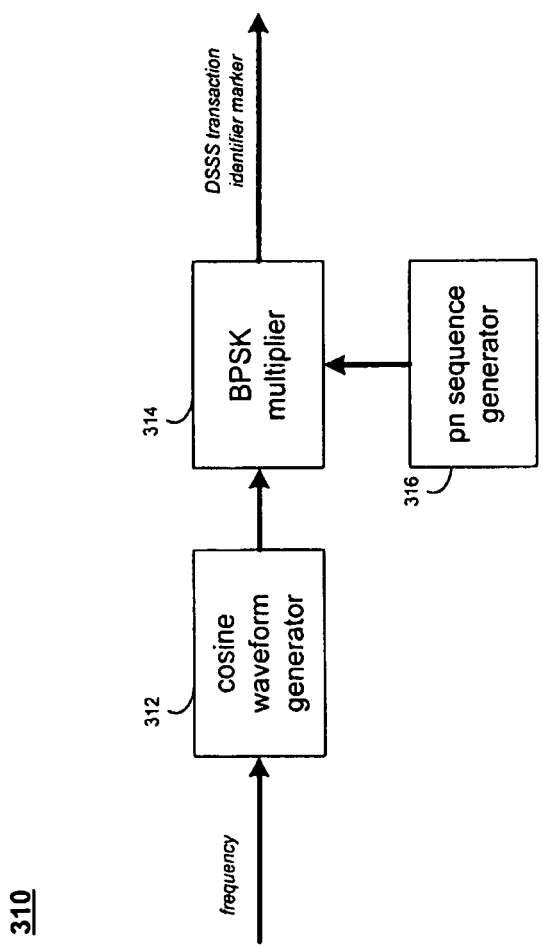
FIG. 7 is a diagrammatic view of a portion of the digital media watermarking system of FIG. 2.

Given the values provided by L and M, default transaction identifier embedder 254 may generate 304 the spread spectrum watermark. As is known in the art, the principles of Direct Sequence Spread Spectrum (DSSS) technology are utilized to generate transaction identifier 210. For example and referring also to FIG. 7, when generating 304 the spread spectrum watermark, cosine waveform generator 306 may generate a cosine waveform based upon an input of the desired frequency. Cosine waveform generator 306 may then provide the generated cosine waveform to Binary Phase Shift Keying (BPSK) Multiplier 308. Concurrently, pseudo-noise (pn) sequence generator 310 may provide an accompanying pn sequence to BPSK multiplier 308, thus enabling BPSK multiplier 308 to generate transaction identifier 210.

As is known in the art, pn sequence generator 310 may generate a pn sequence that is a secondary sequence obtained from a root pn sequence by cyclic rotation. Thus, pn sequence generator 310 may generate a cosine waveform that corresponds to the state of a chip (i.e., "1" or "0") based upon the root pn sequence.

For example, a chip that corresponds to a cosine waveform with a length of twelve samples may be used to represent binary "1", and its complement may be used to represent binary "0". The actual length of the generated pn sequence may thus be given by $2^{12}-1$ (i.e., 4095), which may be made even by adding a dummy chip (i.e., 4095+1=4096). Accordingly, the length of a single DSSS signal may be 49,152 samples (i.e., 4096*12), and such a signal may be used to represent a marker as described above.

Moreover, as processes utilizing BPSK multipliers inherently generate two types of markers (i.e., binary "1" or binary "0"), a pn sequence consisting of a string of binary 1's may be referred to as a positive marker. Conversely, a pn sequence consisting of a string of binary 0's may be referred to as a negative marker. Thus, in the event that default values are used when generating 304 the spread spectrum watermark (e.g., transaction identifier 210 or asset identifier 212), BPSK multiplier 308 may generate a positive or negative marker.

Referring again to FIG. 6(a), default transaction identifier embedder 254 may set 312 several initial count values related to the embedding of transaction identifier 210. As digital audio files frequently begin with low native spectral energy (i.e., low audible sound), setting 312 an initial count value may establish an offset value, e.g., init, from which a first transaction identifier 210 may be embedded into the digital audio file. Additionally, when setting 312 an initial count value, the number of transaction identifiers 210 and the residual transaction identifiers (not shown) that may be embedded into uncompressed media data file 200 may be calculated. Setting 312 an initial count value may also initialize a counter, e.g., transID_count, that may be used to maintain the current number of times that transaction identifier 210 has been embedded.

For example, where J represents the number of transaction identifiers 210 that may be inserted 152, J may be given as:

$$J=|(N-init)/(L+M)|$$

$$j=|((N-init)\%(L+M))/(L+1)|$$

$$J=J+j$$

As will be discussed in greater detail below, one or more synchronization markers (not shown) may be embedded into uncompressed media data file 200 to enhance the detectability of a watermark (e.g., transaction identifier 210 or asset identifier 212). In such a case, the synchronization marker may be accounted for in the calculation of J. For example:

$$J=|(N-init)/(L+M+2)|$$

$$j=|((N-init)\%(L+M+2))/(L+1)|$$

$$J=J+j$$

Given the above calculated values for e.g., the number of transaction identifiers 210 (i.e., J), the length of transaction identifier 210 and asset identifier 212 (i.e., L and M, respectively), and the number of segments of uncompressed media data file 200 (i.e., N), as well as other values to the extent necessary, embedding may proceed.

The remaining processes (i.e., 314, 316, 18, 320, 322, 324, and 326) may constitute a loop for embedding transaction identifier 210 a number of times (as represented by J). For illustrative purposes, an exemplary embedding process is described. Default transaction identifier embedder 254 may compute 314 the offset of the location in uncompressed media data file 200 where the next transaction identifier 210 may be embedded. Default transaction identifier embedder 254 may initialize 316 a segment counter (e.g., marked_segment- _count) with a default value (e.g., 0) to increment as each segment is marked. Next, a nested loop of processes may be performed by default transaction identifier embedder 254, starting by perceptually modulating and embedding 318 a marker (not shown) of transaction identifier 210 (where L represents the total number of markers constituting transaction identifier 210) into a segment.

The process of perceptually weighting the amplitude of a DSSS signal (i.e., marker) to mask its frequency components by the spectral energy of the native audio is known in the art, which is performed to render the marker below the threshold of human hearing (i.e., inaudible). For example, a perceptually weighted embedder (not shown) may perform a perceptual masking analysis of a segment of uncompressed media data file 200 and, using a weighting amplitude calculator (not shown), modulate the marker to be embedded in the segment. The perceptually weighted embedder may then embed the modulated marker into the segment of uncompressed media data file 200, wherein the modulated marker is inaudible to, e.g., users 88, 90, 92, 94.

After perceptually modulating and embedding 318 a marker of transaction identifier 210, default transaction identifier embedder 254 may increment 320 the value of the counter representing the number of marked segments (e.g., marked_segment_count). This nested loop of processes 318, 320 may be repeated as long as the number of marked segments is less than the number of markers constituting transaction-identifier 210. That is, default transaction identifier embedder 254 may confirm 322 that transaction identifier 210 was successfully embedded.

Once default transaction identifier embedder 254 confirms 322 that transaction identifier 210 was embedded successfully, default transaction identifier embedder 254 may increment 324 the value of the counter used to maintain the current number of times transaction identifier 210 has been embedded (e.g., transID_count). Default transaction identifier embedder 254 may confirm 326 that transaction identifier 210 has been embedded into uncompressed media data file 200 the desired number of times (e.g., by calculating whether transID_count is less than J). If default transaction identifier embedder 254 does not confirm 326 such, the process is repeated (from offset computation process 314). If 326 default transaction identifier embedder 254 confirms that all watermarks (e.g., one or more default watermarks 202) have been successfully embedded into uncompressed digital media file 200, digital media watermarking process 50 has successfully generated watermarked uncompressed media data file 204.

While the above discussion has generally described the insertion 152 of transaction identifier 210 into uncompressed media data file 200, the same procedure may be followed for insertion 152 of asset identifier 212, or any other watermark including, but not limited to: a synchronization word, a speed change word, a space, a content provider identifier, and a distributor identifier. Moreover, the above discussion has involved inserting 152 watermarks with default values (e.g., transaction identifier 210), however, this is not to be construed as a limitation of this disclosure.

For example, in many instances asset-specific information represented by asset identifier 212 may be known apriori. That is, although transaction information (represented by e.g., transaction identifier 210) may not be known prior to the initiation of a transaction by e.g., users 88, 90, 92, 94, asset information related to an asset (e.g., uncompressed media data file 200) may be known in advance. Thus, rather than inserting 152 asset identifier 212 with default values into uncompressed media data file 200, asset identifier 212 may be inserted 152 with asset-specific information. Examples of asset-specific information may include, but are not limited to: artist information, album information, track information, label information, and release date information.

As described above, digital media watermarking process 50 may include non-realtime media manager 252, which manages the transformation of uncompressed media data file 200 into watermarked compressed media data file 206. In the above example wherein asset identifier 212 may be inserted 152 into uncompressed media data file 200 (in lieu of transaction identifier 210), digital media watermarking process 50 may direct non-realtime media manager 252 to manage the delivery of uncompressed media data file 200 from uncompressed digital media library 62 to default and/or non-generic asset identifier embedder 256. Alternatively, if default transaction identifier embedder 254 first embedded one or more transaction identifiers 210 into uncompressed digital media data file 200 to form watermarked compressed media data file 206, non-realtime media manager 252 may manage the delivery of watermarked compressed media data file 206 to default and/or non-generic asset identifier embedder 256 from default transaction identifier embedder 254.

For illustrative purposes, the following description assumes that default transaction identifier embedder 254 has previously embedded one or more transactional identifiers 210 into uncompressed media data file 200, however this is not intended to be a limitation of this disclosure. For example, default and/or non-generic asset identifier embedder 256 may insert 152 asset identifier 212 into uncompressed media data file 200 without one or more transaction identifiers 210 having been inserted 152.

Referring also to FIG. 6(*b*), there is shown a flowchart representing the various processes that may be utilized to insert 152 asset identifier 212 into uncompressed media data file 200 (i.e., at default and/or non-generic asset identifier embedder 256). In preparation for insertion 152 of asset identifier 212, non-realtime media manager 252 may read 328 uncompressed media data file 200 to default and/or non-generic asset identifier embedder 256 from default transaction identifier embedder 254.

Additionally, non-realtime media manager 252 may also read 330 the parameters (not shown) of uncompressed media data file 200 and the watermark. The parameters of uncompressed media data file 200, after insertion 152 of transaction identifier 212 by default transaction identifier embedder 254, may include, but are not limited to: the number of segments included within uncompressed media data file 200 (i.e., N), the number of markers included within transaction identifier 210 (i.e., L), the number of markers included within asset identifier 212 (i.e., M), the residual transaction identifiers (not shown), and asset-specific information (not shown).

Given the parameters provided by non-realtime media manager 252, default and/or non-generic asset identifier embedder 256 may generate 332 the spread spectrum watermark. As is conventionally employed in the art, the principles of Direct Sequence Spread Spectrum (DSSS) are utilized to generate asset identifier 212. For example, and referring again to FIG. 7, cosine waveform generator 306 may generate a cosine waveform based upon an input of the desired frequency. Cosine waveform generator 306 may then provide the generated cosine waveform to Binary Phase Shift Keying (BPSK) Multiplier 308. Concurrently, pseudo-noise (pn) sequence generator 310 may provide an accompanying pn sequence to BPSK multiplier 308, enabling BPSK multiplier 308 to generate asset identifier 212.

As is known in the art and as discussed above, a pn sequence generator may generate a pn sequence that is a secondary sequence obtained from a root pn sequence by cyclic rotation. Thus, pn sequence generator 310 generates a cosine waveform that corresponds to the state of a chip (i.e., "1" or "0") based on the root pn sequence. For example, a chip that corresponds to a cosine waveform with a length of twelve samples may be used as to represent binary "1", and its complement may be used to represent binary "0". The actual length of the generated pn sequence may thus be given by $2^{12}-1$ (i.e., 4095), which may be made even by adding a dummy chip (i.e., 4095+1=4096). Accordingly, the length of a single DSSS signal may be 49,152 samples (i.e., 4096*12), and such a signal may be used to represent a marker as described above.

Moreover, as processes utilizing BPSK multipliers inherently generate two types of markers (i.e., binary "1" or binary "0"), a pn sequence consisting of a string of binary 1's may be referred to as a positive marker. Conversely, a pn sequence consisting of a string of binary 0's may be referred to as a negative marker. Thus, in the event that default values are used when generating 304 the spread spectrum watermark (e.g., transaction identifier 210 or asset identifier 212), BPSK multiplier 308 may generate a positive or negative marker. However, as mentioned above, if asset-specific information is provided by e.g., non-realtime media manager 252, default and/or non-generic asset identifier embedder 256 may not generate 332 a positive or negative marker. Rather, default and/or non-generic asset identifier embedder 256 may generate 332 markers comprising asset identifier 212 that represent the asset-specific information.

For example, if asset-specific information is available, non-realtime media manager 252 may obtain an index of asset identifiers (not shown) and, using this index, obtain an asset-specific identifier (not shown). The asset-specific identifier may then be converted to a bit pattern (not shown) that may be utilized by default and/or non-generic asset identifier embedder 256 when generating 332 the spread spectrum watermark. Additionally, default and/or non-generic asset identifier embedder 256 may generate 332 markers including asset identifier 212 that represent the bit pattern.

Referring again to FIG. 6(b), default and/or non-generic asset identifier embedder 256 may set 334 several initial count values related to the embedding of asset identifier 212. As digital audio files frequently begin with low native spectral energy (i.e., low audible sound), count setting 334 may establish an offset value, e.g., init, from which a first asset identifier 212 may be embedded into the digital audio file. The value derived for init may also include an offset for a previously embedded watermark (e.g., transaction identifier 210). Additionally, when setting 334 an initial count value, the number of asset identifiers 212 that may be embedded into uncompressed media data file 200 may be calculated, taking into account not only the total number of segments (i.e., N) but also any other watermarks previously embedded (e.g., transactional identifier 210). Setting 334 an initial count value may also initialize a counter, e.g., assetID_count, that may be used to maintain the current number of times asset identifier 212 has been embedded.

For example, where K represents the number of asset identifiers that may be inserted 152, K may be given as:

```
if (j == 0) {
    K = J;
}
else if (j == 1) {
    K = J - 1;
}
```

As will be discussed in greater detail below, one or more synchronization markers (not shown) may be embedded into uncompressed media data file 200 to enhance the detectability of a watermark (e.g., transaction identifier 210 or asset identifier 212). In such a case, the synchronization marker may be accounted for in the calculation of K.

Given the above calculated values for, namely, the number of asset identifiers 212 (i.e., K), the length of asset identifier 212 and transaction identifier 210 (i.e., M and L, respectively), and the number of segments of uncompressed media data file 200 (i.e., N), as well as other values to the extent necessary, embedding may proceed.

The remaining processes (i.e., 336, 338, 340, 342, 344, 346, and 348) may constitute a loop for embedding asset identifier 212 a number of times (as represented by K). For illustrative purposes, an exemplary embedding process is described. Default and/or non-generic asset identifier embedder 256 may compute 336 the offset of the location in uncompressed media data file 200 where the next asset identifier 212 may be embedded.

For example, where offset represents the location in uncompressed media data file 200 where the next asset identifier 212 may be embedded, offset may be given by:

$$\text{offset}=\text{init}+\text{assetID\_count}*(L+M)$$

Default and/or non-generic asset identifier embedder 256 may initialize 338 a segment counter (e.g., marked_segment_count) with a default value (e.g., 0) to increment as each segment is marked. A nested loop of processes may be performed, starting by perceptually modulating and embedding 340 a marker (not shown) of asset identifier 212 (where M represents the total number of markers constituting asset identifier 212) into a segment.

As described above, well-known in the art is the process of perceptually weighting the amplitude of a DSSS signal (i.e., marker) to mask its frequency components by the spectral energy of the native audio. This is performed to render the marker below the threshold of human hearing (i.e., inaudible). For example, a perceptually weighted embedder (not shown) may perform a perceptual masking analysis of a segment of uncompressed media data file 200 and, using a weighting amplitude calculator (not shown), modulate the marker to be embedded in the segment. The perceptually weighted embedder may then embed the modulated marker into the segment of uncompressed media data file 200, wherein the modulated marker is inaudible to e.g., users 88, 90, 92, 94.

After perceptually modulating and embedding 340 a marker of asset identifier 212, default and/or non-generic asset identifier embedder 256 may increment 342 the value of the counter representing the number of marked segments (e.g., marked_segment_count). This nested loop of processes 340, 342 may be repeated as long as the number of marked segments is less than the number of markers constituting asset identifier 212. That is, default and/or non-generic asset identifier embedder 256 may confirm 344 that asset identifier 212 was successfully embedded.

Once default and/or non-generic asset identifier embedder 256 confirm 344 that asset identifier 212 was embedded successfully, default and/or non-generic asset identifier embedder 256 may increment 346 the value of the counter used to maintain the current number of times asset identifier 212 has been embedded (e.g., assetID_count). Default and/or non-generic asset identifier embedder 256 may confirm 348 that asset identifier 212 has been embedded into uncompressed media data file 200 the desired number of times (e.g., by calculating whether assetID_count is less than K). If 348 default and/or non-generic asset identifier embedder 256 does not confirm such, the process is repeated (from offset computation process 336). If default and/or non-generic asset identifier embedder 256 confirms that all watermarks have been successfully embedded 326 into uncompressed media data file 200, digital media watermarking process 50 has successfully generated watermarked uncompressed media data file 204.

Referring also to FIGS. 8(a)-8(e), the order in which watermarks (e.g., transaction identifier 210, asset identifier 212, and synchronization word 350) may be inserted 152 may conform to a watermark scheme. Alternatively, the order may be random. Accordingly, the following discussion is not to be construed as a limitation on the order of insertion 152.

Referring again to FIGS. 3-5, upon the completion of inserting 152 all desired watermarks (as described above), digital media watermarking process 50 may compress 154 watermarked uncompressed media data file 204 to form watermarked compressed media data file 206. Digital media watermarking process 50 may also compress 156 uncompressed media data file 200 to form unwatermarked compressed media data file 208. For example, non-realtime media manager 252 may manage the delivery of watermarked uncompressed media data file 204 to watermarked digital media encoder 258 for compression 154. Concurrently, non-realtime media manager 252 may also manage the delivery of uncompressed media data file 200 to unwatermarked digital media encoder 260 for compression 156.

Watermarked digital media encoder 258 and unwatermarked digital media encoder 260 may then compress 154, 156 watermarked uncompressed media data file 204 and uncompressed media data file 200, respectively. Non-realtime media manager 252 may manage the encoding parameters employed by watermarked digital media encoder 258 and unwatermarked digital media encoder 260, as the compression parameters may need to be substantially the same for modification 158 of watermarked compressed media data file 206. Examples of parameters employed may include, but are not limited to, the number of frames, the identity of each frame, and the size of the frames.

Any number of known compression schemes may be employed by watermarked digital media encoder 258 and unwatermarked digital media encoder 260. Examples of such compression schemes may include but are not limited to MPEG-1, MPEG-2, MPEG-4, H.263, H.264, Advanced Audio Coding, and other techniques promulgated by e.g., the International Standards Organization and the Motion Picture Experts Group.

The resulting compressed files (i.e., watermarked compressed media data file 206 and unwatermarked compressed media data file 208) and their associated parameters (not shown) may then be received by compressed media data library 262. Thus, compressed media data library 262 may store two compressed versions of each uncompressed media data file 200, one watermarked version (i.e., watermarked compressed media data file 206) and one unwatermarked version (i.e., unwatermarked compressed media data file 208).

Figure 9:
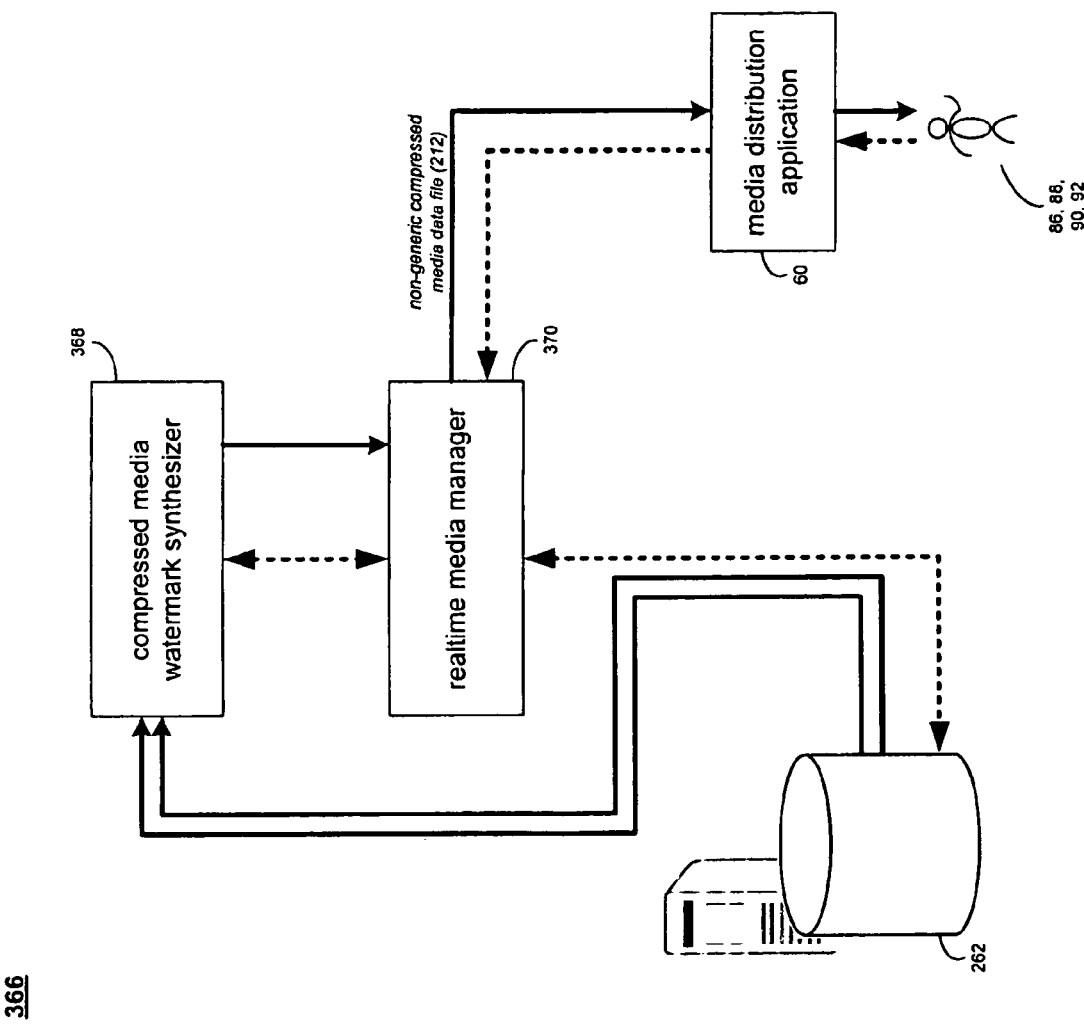
FIG. 9 is a diagrammatic view of a portion of the digital media watermarking system of FIG. 2.

The Realtime Process:

Referring also to FIG. 9, digital media watermarking process 50 may perform realtime processing 364. As discussed above, transactional information may not be known prior to a user (e.g., users 88, 90, 92, 94) initiating a transaction, thus realtime processing 364 may be utilized by digital media watermarking process 50 to modify 158 watermarked compressed media data file 206 to associate it with transaction-specific information. Additionally, asset identifier 212 may not have been associated with asset-specific information when asset identifier 212 was inserted 152 into watermarked compressed media data file 206 during non-realtime processing 250. Thus, digital media watermarking process 50 may utilize realtime processing 364 to modify 158 watermarked compressed media data file 206 to associate asset identifier 212 with asset-specific information.

To accomplish the above-described realtime processing 364 of digital media watermarking process 50, one or more of the following may be utilized: compressed media synthesizer 366; and realtime media manager 368. As will be discussed in greater detail below, compressed media synthesizer 366 may modify 158 watermarked compressed media data file 206 by combining at least a portion of unwatermarked compressed media data file 208 with at least a portion of watermarked compressed media data file 206 to form non-generic compressed media data file 214.

Figure 10A:
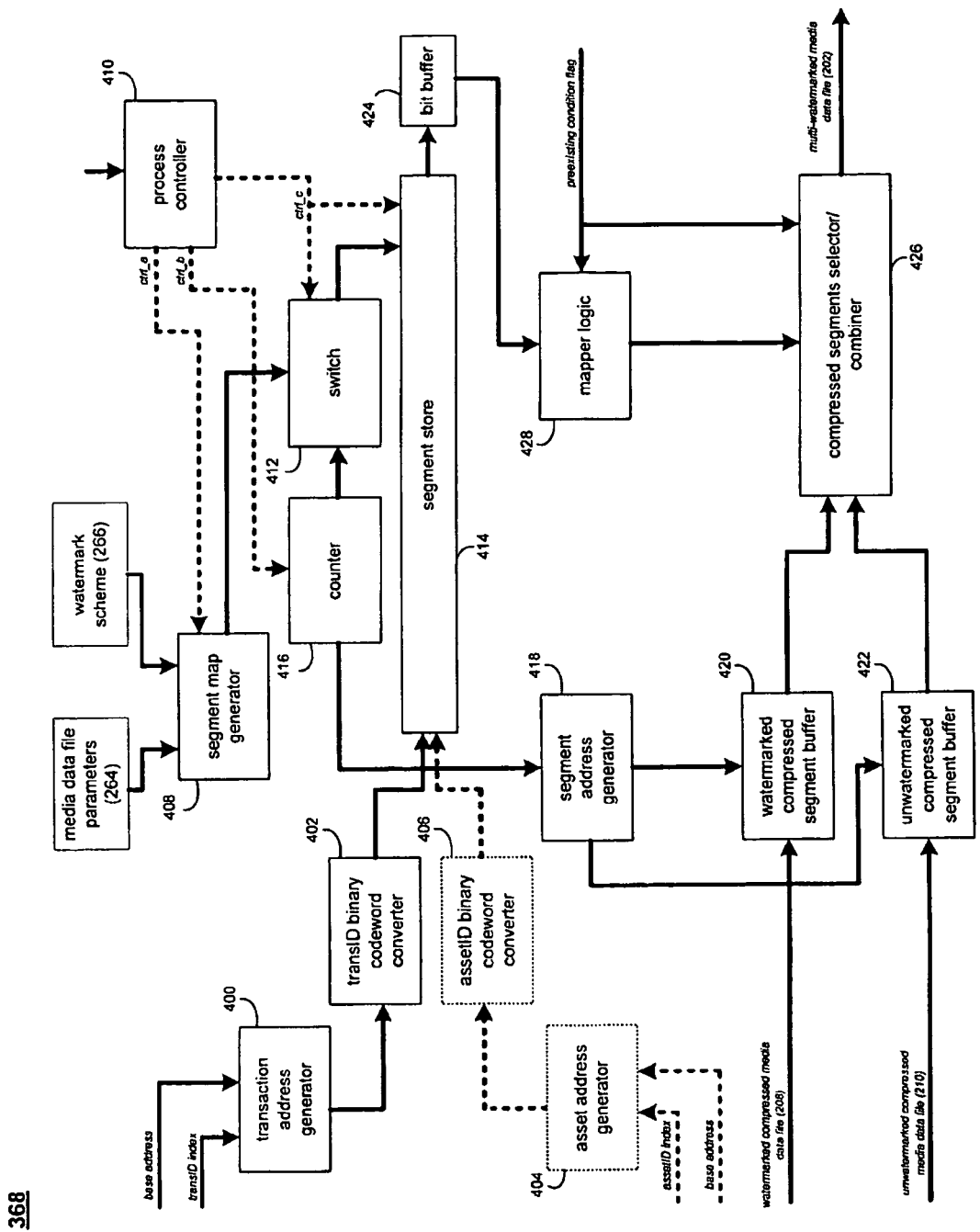
FIG. 10 is a diagrammatic view of a portion of the digital media watermarking system of FIG. 2.
Figure 10C:
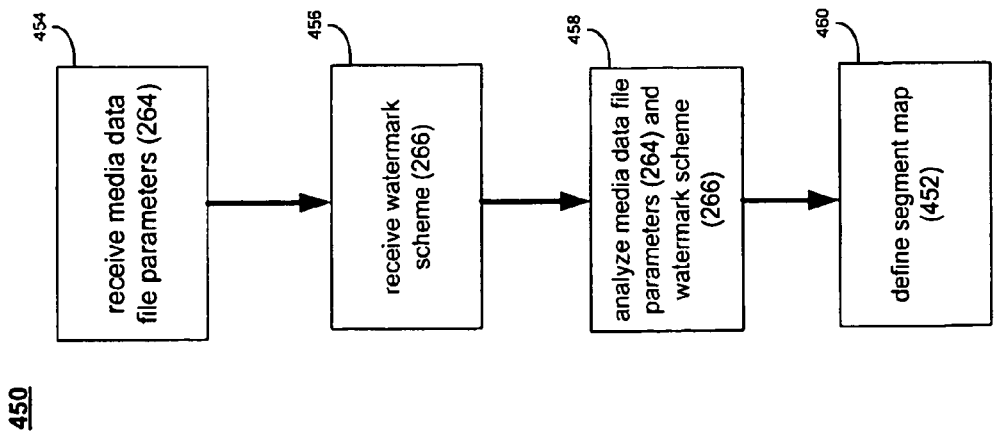
Figure 10B:
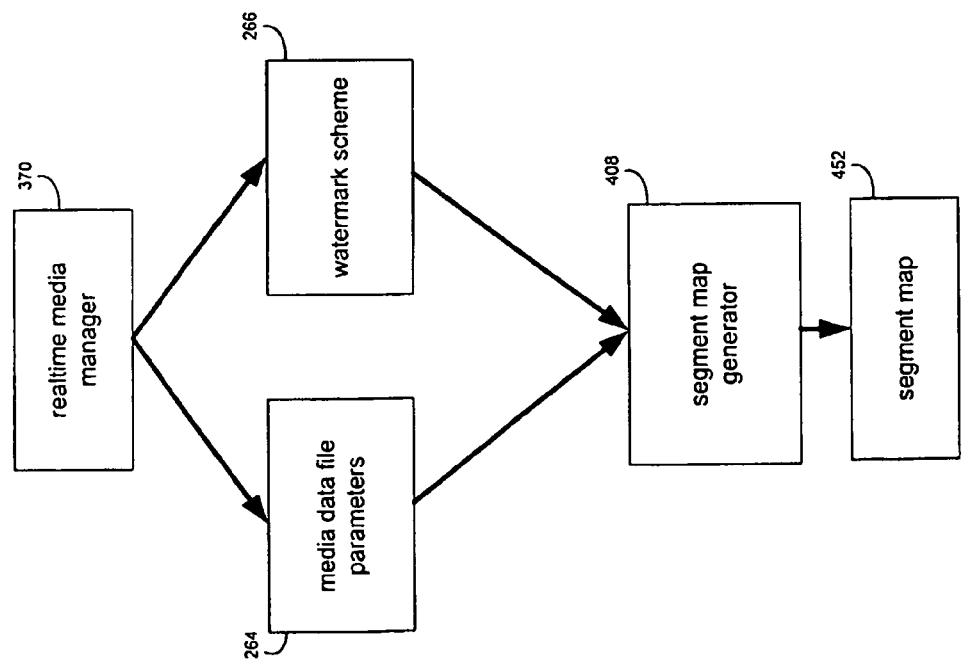

Referring also to FIG. 10, there is shown an illustrative view of compressed media synthesizer 366. The following example explains the manner in which digital media watermarking system 50 generally (and compressed media synthesizer 366 specifically) may modify 158 watermarked compressed media data file 206 to form non-generic compressed media data file 214. Moreover, the following example assumes that default values (as described above) were utilized during insertion 152 of transaction identifier 210 and asset identifier 212. However, this is not intended to be a limitation of this disclosure, as asset-specific information may be utilized during insertion 152 of asset identifier 212. Additionally, while the following example describes the modification 158 of two watermarks (i.e., transaction identifier 210 and asset identifier 212), it is to be understood that any suitable type of watermark (as mentioned above) may be modified 158.

Upon request from media distribution application 60 (e.g., when one or more of users 88, 90, 92, 94 initiates a transaction), realtime media manager 368 may provide a transID index and a base address for the transID index to transaction address generator 400. Transaction address generator 400 may then generate the actual address of transID and provide such to transID binary codeword converter 402. Similarly, realtime media manager 368 may provide an assetID index and a base address for the assetID index to asset address generator 404. Asset address generator 404 may then generate the actual address of assetID and provide such to assetID binary codeword converter 406.

TransID binary codeword converter 402 and assetID binary codeword converter 406 may then convert and store a binary representation of the transID and assetID (respectively) that may be utilized for modifying 158 watermarked compressed media data file 206. The binary output of transID binary codeword converter 402 and assetID binary codeword converter 406 may be a bitpattern (i.e., 1's and 0's), wherein each binary bit represents the watermark marker (as described above) of transID and assetID, respectively.

Concurrently, realtime media manager 368 may provide the parameters of watermarked compressed media data file 206 and unwatermarked compressed media data file 208 to location and segment map generator 408. The parameters may include, but are not limited to: the number of segments (i.e., N) included within watermarked compressed media data file 206 and unwatermarked compressed media data file 208, the number of markers (i.e., L) included within transaction identifier 210, the number of markers (i.e., M) included within asset identifier 212, watermark offset values (i.e., init), and the selected scheme/pattern of inserted 152 watermarks (examples of which are shown in FIGS. 8(a)-8(e)). Location and segment map generator 408 may then output a markup-map (not shown) that provides details (e.g., the location of transaction identifiers 210 and asset identifiers 212) pertaining to all segments of the compressed media files (i.e., watermarked compressed media data file 206 and unwatermarked compressed media data file 208).

Process controller 410 may be used to direct the flow of information in compressed media synthesizer 366. For example, when process controller 410 activates ctrl_a signal and deactivates ctrl_c signal, the output of location and segment map generator 408 may be transferred to switch 412. The output (as described above) of location and segment map generator 408, after transfer to switch 412, may serve as an address to access segment store 414 from which the bitpattern of e.g., transID and assetID, may be copied multiple times. The amount of storage (in bits) of segment store 414 may be equal to the number of segments (i.e., N) in the digital media data file (e.g., watermarked compressed media data file 206) being processed.

Additionally, counter 416 may maintain a count that may be provided to segment address generator 418 for generation of the address of a segment within watermarked compressed media data file 206 and unwatermarked compressed media data file 208 (stored in watermarked compressed segment buffer 420 and unwatermarked compressed segment buffer 422, respectively) to be modified 158. Using the generated address, the corresponding segment from watermarked compressed segment buffer 420 and unwatermarked compressed segment buffer 422 may be copied into compressed segments selector/combiner 426. Concurrently, process controller 410 may activate ctrl_b signal to indicate that the count of counter 416 may be provided to switch 412. This may induce the individual bits stored in segment store 414 to be copied to bit buffer 424 one bit at a time.

The individual bits that were copied to bit buffer 424 may then be provided to mapper logic 428 to be utilized by compressed segments selector/combiner 426. Based on the mapped value of the bit in bit buffer 424 (at the output of mapper logic 428) compressed segments selector/combiner 426 may then select either the segment of watermarked compressed media data file 206 or unwatermarked compressed media data file 208 in the formation of non-generic compressed media data file 214.

For example, if the mapped value of the bit in bit buffer 424 (again, at the output of mapper logic 428) is "1", compressed segments selector/combiner 426 may select the segment (e.g., segment number "100") of watermarked compressed media data file 206 for use in formation of non-generic compressed media data file 214. This segment (i.e., segment number "100") may then constitute e.g., segment number "100" of non-generic compressed media data file 214. Dependent upon the mapped value of the next bit in bit buffer 424 (at the output of mapper logic 428), the subsequent segment (e.g., segment number "101") of non-generic compressed media data file 214 may be formed by using e.g., segment number "101" of unwatermarked compressed media data file 208 (i.e., if the mapped value is "0"). The result of the selection/combination of segments of watermarked compressed media data file 206 and unwatermarked compressed media data file 208 by compressed segments selector/combiner 426 may form non-generic compressed media data file 214.

The logic used by mapper logic 428 for this selection/combination process accounts for several encoding concerns. For illustrative purposes only, it may be helpful to analogize mapper logic 428 to a final arbiter in the decision of whether to utilize a watermarked segment of the digital media data file (i.e., watermarked compressed media data file 206) or an unwatermarked segment of the digital media data file (i.e., unwatermarked compressed media data file 208) in the formation of non-generic compressed media data file 214. In such an analogy, bit buffer 424 may provide the data necessary to form a particular watermark in non-generic compressed media data file 214, and mapper logic 428 may decide, for each watermark, whether embedding is appropriate.

For example, if a series of segments have low native spectral energy (and, thus, have the undesirable effect of rendering an embedded watermark audible), a preexisting condition flag (e.g., with a mapped value of "0") may indicate to mapper logic 428 that compressed segments selector/combiner 426 should only select segments from unwatermarked compressed media data file 208 in the formation of the corresponding segments in non-generic compressed media data file 214. This logic may also be followed if mapper logic 428 is aware of metadata that may be corrupted due to the presence of a watermark.

Alternatively, if preexisting watermarks exist in e.g., uncompressed media data file 200 (e.g., sync words, speed change markers, content provider identifiers, distributor identifiers) that must be present in non-generic compressed media data file 214, mapper logic 428 may override the mapped value of bit buffer 424 with a value of "1". This mapped value may remain effective for the sequence of segments that comprise the preexisting watermark, thus enabling mapper logic 428 to instruct compressed segments selector/combiner 426 to select segments from e.g., watermarked compressed media file 206 in the formation of that portion of non-generic compressed media data file 214.

This selection/combination process may be repeated for all segments of the digital media data file as calculated at N, above. The combination of the watermarked and unwatermarked segments may form non-generic compressed media data file 214, which may include, but is not limited to, a plurality of non-generic transaction identifiers 210 and asset identifiers 212. As described above, these identifiers may be used to identify information pertaining to specific transactions initiated by e.g., users 88, 90, 92, 94 as well as information pertaining to the specific asset (e.g., the digital media data file). Upon completion of the above-described process, realtime media manager 368 may manage the transfer of non-generic compressed media data file 214 from compressed segments selector/combiner 426 to media distribution application 60 for e.g., delivery to one or more of users 88, 90, 92, 94.

While the above discussion describes the insertion 152 of unique watermarks (e.g., transaction identifier 210 and asset identifier 212), this is not intended to be a limitation. For example, digital media watermarking process 50 may only insert 152 transaction identifier 210 (or only asset identifier 212). Furthermore, digital media watermarking process 50 may insert 152 the same watermark (e.g., transaction identifier 210 or asset identifier 212) in a multitude of locations throughout non-generic compressed media data file 214.

Figure 11:
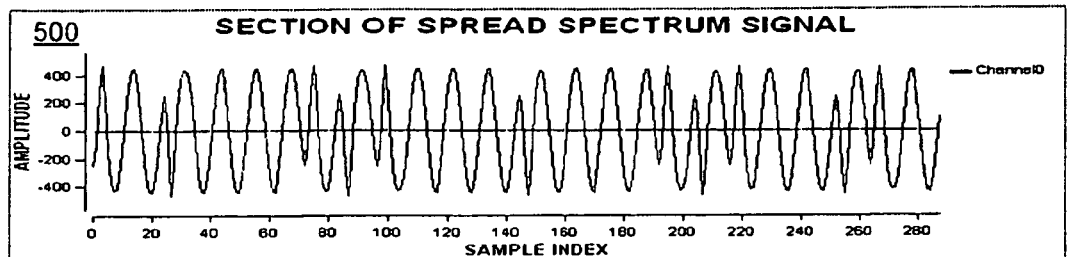
FIG. 11 is a diagrammatic view of a spread spectrum marker signal.

As discussed above, digital media watermarking process 50 may utilize spread spectrum technology to generate a spread spectrum watermark. Referring also to FIG. 11, there is shown section 500 of a spread spectrum marker signal (at the output of Binary Phase Shift Keying (BPSK) Multiplier 308).

As discussed above, digital media watermarking process 50 may utilize pn sequences. A pn sequence is a pseudorandom sequence of binary numbers and is often used in applications such as scrambling/descrambling, and direct sequence spread spectrum communication. A reason for using a pn sequence may have to do with its properties that allow one to reliably detect the presence of the pn sequence by correlating it with a known sequence to find their similarity. For example, if two sequences are identical/near identical, their correlation may possess a high peak. Conversely, if they are different, the correlation value is not peaked/is small. Accordingly, reliable detection of pn sequence based markers is possible from a portion of the pn sequence even when impacted by noise conditions, partial erasures, and intentional attacks.

To generate a pn sequence, digital media watermarking process 50 may utilize a pn sequence generator. With respect to pn sequence generators, a primitive binary polynomial (called the generator polynomial) may be expressed as:

$$G(z) = g_r z^r + g_{r-1} z^{r-1} + \ldots + g_2 z^2 + g_1 z^1 + g_0$$

Concerning the above-stated primitive binary polynomial, the leading term $g_r$ and the constant term $g_o$ of the generator polynomial may be a "1", as the polynomial is a primitive. This may result in the updated expression for the generator polynomial as follows.

$$G(z) = z^r + g_{r-1} z^{r-1} + \ldots + g_2 z^2 + g_1 z^1 + 1$$

Figure 12:
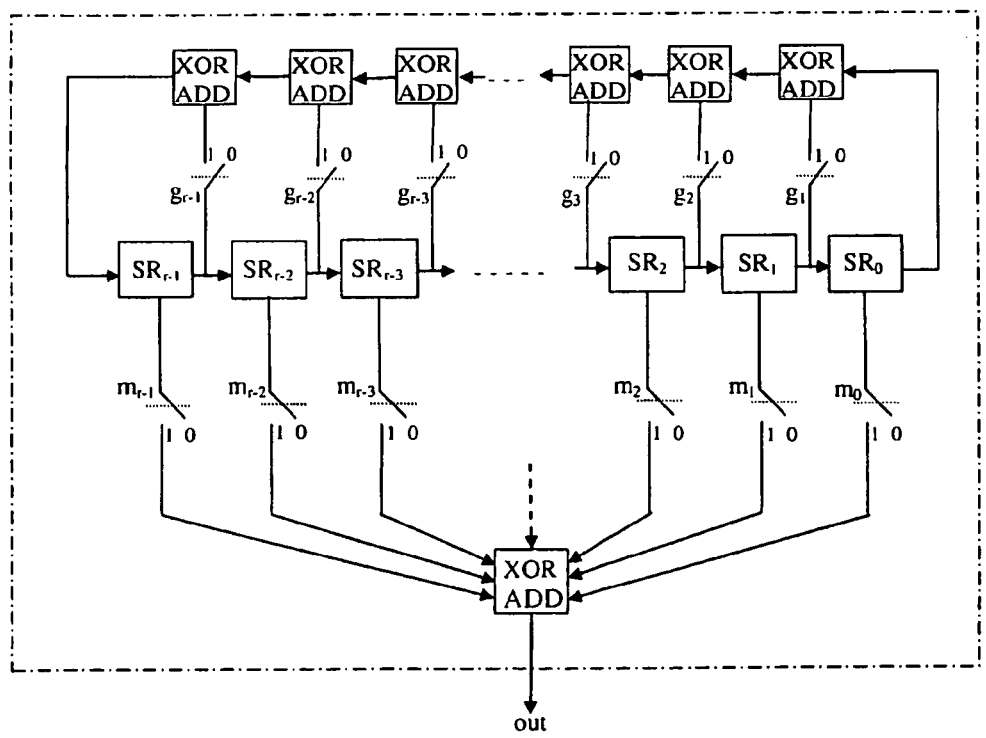
FIG. 12 is a diagrammatic view of a pn sequence generator.

The general equation of the generator polynomial stated above is known in the art as well as its mapping to the block diagram of pn sequence generator 310 (as shown in FIG. 12), which illustrates shift registers having feedback and XOR adders. All r shift registers in pn sequence generator 310 may update their values based on the values of the incoming arrow to the shift register. The adders may perform modulo 2 XOR addition (0+0=0, 0+1=1+0=1, 1+1=0). If the coefficient $g_k$ is a "1", there may be a connection between the kth register to the adder.

In general, pn sequence generator 310 may include shift registers $SR_0, SR_1, SR_2, \ldots, SR_{r-3}, SR_{r-2}, SR_{r-1}$; corresponding XOR Adders; switches $g_1, g_2, g_3, \ldots g_{r-3}, g_{r-2}, g_{r-1}$, and switches $m_0, m_1, m_2, \ldots, m_{r-3}, m_{r-2}, m_{r-1}$.

Basically, a pn sequence may be defined by its generator polynomial that, in turn, specifies which of the $g_k$ coefficients are 1's or 0's. For example, if the following generator polynomial is used to generate a pn sequence of length 4,095, coefficients $g_6, g_8$, and $g_{11}$ may be set to "1", and coefficients $g_1, g_2, g_3, g_4, g_5, g_7, g_9$, and $g_{10}$ may be set to "0".

$$G(z) = z^{12} + z^{11} + z^8 + z^6 + 1$$

In addition, an initial state vector (e.g., a bitpattern sequence of 1's and 0's) may be used to provide an initial value of "1" or "0" to each shift register. This bitpattern may have at least a single "1" to ensure a nonzero pn sequence. Further, a shift parameter may be used to shift the output sequence with respect to the starting point by configuring one or more switches (e.g., mask $m_k$), by setting them to "1" (i.e., closed switch) or "0" (i.e., open switch). For instance if $m_0$="1" and all other mask bits are set to "0", this may correspond to only switch $m_0$ being closed while all other switches are open, thus corresponding to a delay of zero. Thus, the generator polynomial, initial bitpattern, and mask bitpattern taken together may customize pn sequence generator 310.

In order to embed the spread spectrum signal within an audio stream in an imperceptible manner, well known psychoacoustic spectral masking properties may be utilized. The human ear's inability to perceive tonal audio as well as noise like frequency components in the neighborhood of strong spectral bands may permit the embedding of a spread spectrum watermark. However, the amplitude of the signal should be carefully adapted/modulated so that all frequency components are adequately masked by the spectral energy of the native audio, thus rendering the watermark well below the threshold of human hearing (i.e., inaudible).

Figure 13:
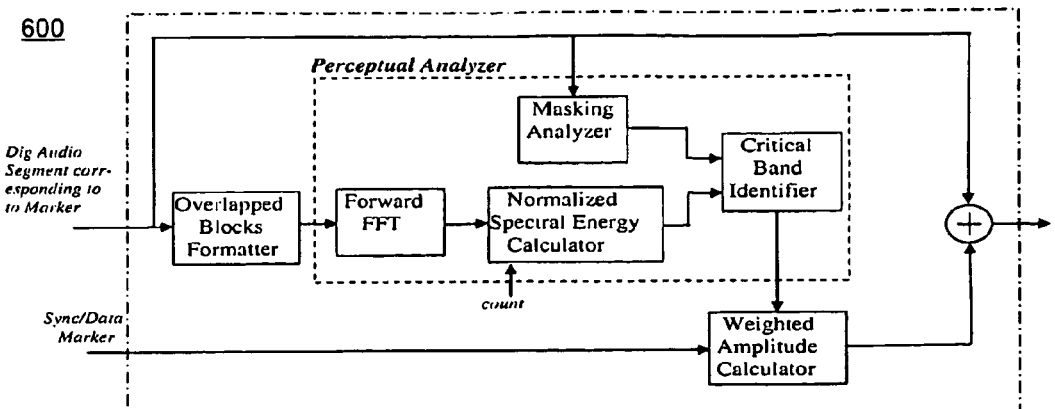
FIG. 13 is a diagrammatic view of a perceptually weighted embedder.

Referring also to FIG. 13, there is shown Perceptually Weighted Embedder 600 that may calculate the perceptual strength to be used for embedding and may embed a (sync or data) marker. The block diagram may be an implementation of the perceptual modulation and embedding process discussed above. For each marker to be embedded, a corresponding audio segment may be input to an overlapped blocks formatter, and the resulting overlapped audio blocks may be processed by a Forward FFT, which converts time domain samples into frequency domain spectral coefficients.

These FFT coefficients may be provided to a Normalized Spectral Energy Calculator that computes normalized energy in bands of this coefficient block. The normalized energy may be provided to a Critical Band Identifier that may also receive information concerning masking properties of the audio block from a Masking Analyzer. The masking properties may be local to audio and thus the amplitude of the spread spectrum signal to be used may be calculated in small audio blocks of e.g., five-hundred-twelve samples with two-hundred-fifty-six new samples and two-hundred-fifty-six samples overlapping with adjacent blocks using a window function. The perceptual masking analysis of audio may yield a masking function PM[b] such that b=0, 1 . . . 41 as indices of critical bands such as that in MPEG-2 Audio. Combining the spectral energy distribution with critical bands provides information about the worst case critical band that has the lowest masking energy. This information concerning the worst case critical band may be used for modulation by a Weighting Amplitude Calculator, which provides the sync/data marker to be embedded. As the perceptual weighting steps are individually known in the state of the art, they are not elaborated in detail. The output of Weighting Amplitude Calculator may contain the modulated sync/data marker that is then added in an adder to the original audio, resulting in output audio including the original audio plus a perceptually weighted version of the marker.

Figure 14:
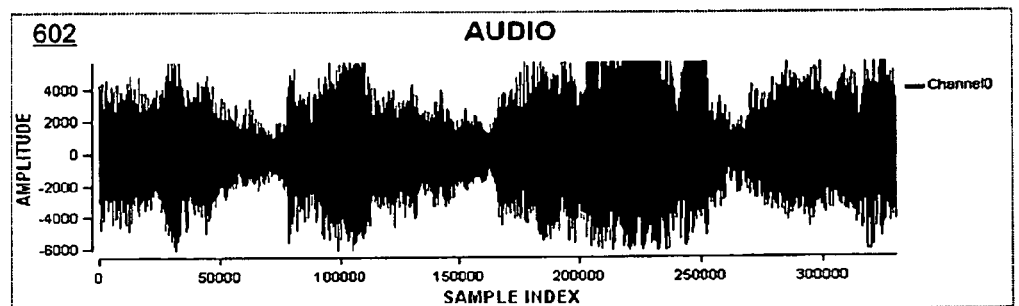
FIG. 14 is a diagrammatic view of an input audio signal.
Figure 15:
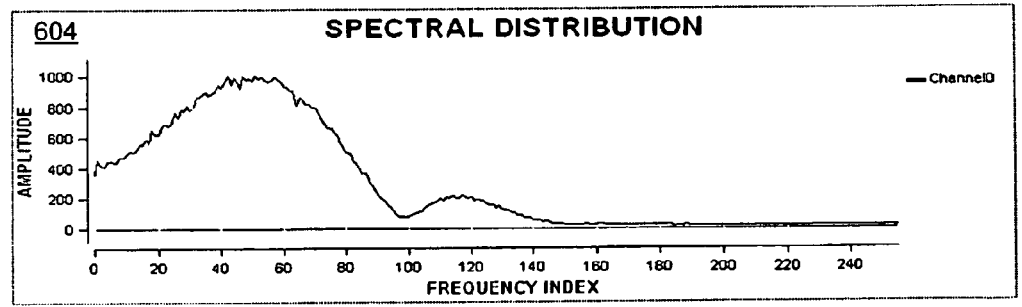
FIG. 15 is a diagrammatic view of a spectral distribution.
Figure 16:
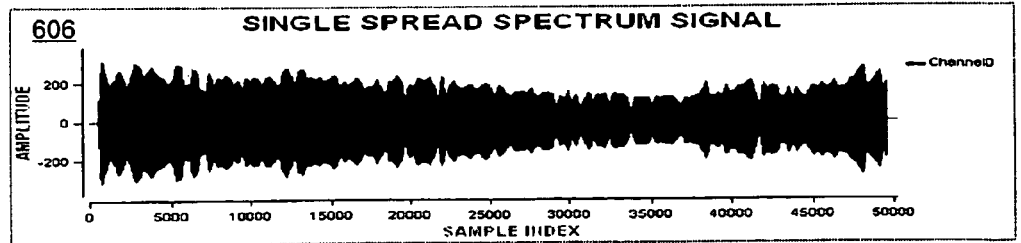
FIG. 16 is a diagrammatic view of a perceptually weighted spread spectrum marker.

For example, consider input audio signal 602 as shown in FIG. 14. By applying the above-described FFT procedures on blocks of audio, the spectral distribution 604 of its two-hundred-fifty six coefficients may be computed (as shown in FIG. 15). Further, after finding normalized energy and computing the critical bands and the worst case critical band, a perceptually weighted spread spectrum marker 606 may be generated (as shown in FIG. 16).

A number of implementations have been described. Nevertheless, it will be understood that various modifications may be made. Accordingly, other implementations are within the scope of the following claims.

What is claimed is:
1. The method comprising:
modifying a compressed digital media data file utilizing a segment map to include a plurality of watermarks, thus generating a multi-watermarked digital media data file, wherein utilizing the segment map includes receiving a watermark scheme of the compressed digital media data file and receiving digital media data file parameters and watermark parameters defining attributes of the compressed digital media data file, and analyzing the digital media data file parameters, the watermark parameters, and the watermark scheme to define the segment map based upon, at least in part, the digital media data file parameters, the watermark parameters, and the watermark scheme.

2. The method of claim 1 wherein the plurality of watermarks comprises one or more of:
   a transaction identifier, an asset identifier, a synchronization word, a speed change word, a space, a content provider identifier, and a distributor identifier.

3. The method of claim 1 wherein the plurality of watermarks comprises at least two identical watermarks.

4. The method of claim 1 wherein the plurality of watermarks comprises at least two unique watermarks.

5. The method of claim 1 wherein the watermark scheme comprises a variable pattern of a transaction identifier, an asset identifier, a synchronization word, a speed change word, a space, a content provider identifier, and a distributor identifier.

6. The method of claim 1 wherein the compressed digital media data file is associated with an uncompressed digital media data file selected from the group consisting of:
   an audio file and a digital audio portion of a digital audiovisual file.

7. A computer program product residing on a non-transitory computer readable medium having a plurality of instructions stored thereon which, when executed by a processor, cause the processor to perform operations comprising:
   modifying a digital media data file utilizing a segment map to include a plurality of watermarks, thus generating a multi-watermarked digital media data file,
   wherein utilizing the segment map includes receiving a watermark scheme, digital media data file parameters, and watermark parameters of a digital media data file and analyzing the digital media data file parameters, the watermark parameters, and the watermark scheme to define the segment map based upon, at least in part, the digital media data file parameters, the watermark parameters, and the watermark scheme.

8. The computer program product of claim 7 wherein the plurality of watermarks comprises one or more of:
   a transaction identifier, an asset identifier, a synchronization word, a speed change word, a space, a content provider identifier, and a distributor identifier.

9. The computer program product of claim 7 wherein the plurality of watermarks comprises at least two identical watermarks.

10. The computer program product of claim 7 wherein the plurality of watermarks comprises at least two unique watermarks.

11. The computer program product of claim 7 wherein the watermark scheme comprises a variable pattern of a transaction identifier, an asset identifier, a synchronization word, a speed change word, a space, a content provider identifier, and a distributor identifier.

12. The computer program product of claim 7 wherein the digital media data file is selected from the group consisting of:
   an audio file and a digital audio portion of a digital audiovisual file.

\* \* \* \* \*

UNITED STATES PATENT AND TRADEMARK OFFICE
CERTIFICATE OF CORRECTION

PATENT NO. : 8,411,897 B2
APPLICATION NO. : 12/300980
DATED : April 2, 2013
INVENTOR(S) : Venugopal Srinivasan et al.

It is certified that error appears in the above-identified patent and that said Letters Patent is hereby corrected as shown below:

On the Title page, in item (56), in column 2, under "Other Publications", line 2, delete "applicaiton" and insert -- application --, therefor.

Signed and Sealed this
Twentieth Day of August, 2013

Teresa Stanek Rea
*Acting Director of the United States Patent and Trademark Office*